United States Patent
Rohwedder et al.

(10) Patent No.: US 7,860,894 B2
(45) Date of Patent: Dec. 28, 2010

(54) TEMPLATE DRIVEN TYPE AND MODE CONVERSION

(75) Inventors: Ekkehard Rohwedder, Newark, CA (US); Quan Wang, Portland, OR (US)

(73) Assignee: Oracle International Corporation, Redwood Shores, CA (US)

(*) Notice: Subject to any disclaimer, the term of this patent is extended or adjusted under 35 U.S.C. 154(b) by 1191 days.

(21) Appl. No.: 11/126,422

(22) Filed: May 11, 2005

(65) Prior Publication Data

US 2006/0005138 A1 Jan. 5, 2006

Related U.S. Application Data

(60) Provisional application No. 60/570,344, filed on May 12, 2004.

(51) Int. Cl.
G06F 17/30 (2006.01)
G06F 3/00 (2006.01)

(52) U.S. Cl. ........................ 707/802; 715/748

(58) Field of Classification Search .......... 707/101, 707/102
See application file for complete search history.

(56) References Cited

U.S. PATENT DOCUMENTS

| | | | | |
|---|---|---|---|---|
| 5,675,804 A * | 10/1997 | Sidik et al. | ............... | 717/139 |
| 6,026,238 A * | 2/2000 | Bond et al. | ............... | 717/141 |
| 6,233,731 B1 * | 5/2001 | Bond et al. | ............... | 717/138 |
| 6,243,709 B1 * | 6/2001 | Tung | ............... | 707/802 |
| 6,636,855 B2 * | 10/2003 | Holloway et al. | ............... | 707/10 |
| 6,917,935 B2 * | 7/2005 | Zwiegincew et al. | ............... | 707/803 |
| 7,322,022 B2 * | 1/2008 | Al-Azzawe et al. | ............... | 717/106 |
| 7,334,216 B2 * | 2/2008 | Molina-Moreno et al. | ............... | 717/109 |
| 7,353,501 B2 * | 4/2008 | Tang et al. | ............... | 717/130 |
| 2001/0039653 A1 * | 11/2001 | Egashira | ............... | 717/9 |
| 2002/0023261 A1 * | 2/2002 | Goodwin et al. | ............... | 717/146 |
| 2002/0123993 A1 * | 9/2002 | Chau et al. | ............... | 707/5 |
| 2002/0129023 A1 * | 9/2002 | Holloway et al. | ............... | 707/10 |
| 2002/0133484 A1 * | 9/2002 | Chau et al. | ............... | 707/3 |
| 2003/0014397 A1 * | 1/2003 | Chau et al. | ............... | 707/3 |
| 2004/0015832 A1 * | 1/2004 | Stapp et al. | ............... | 717/106 |
| 2004/0032861 A1 * | 2/2004 | Lee | ............... | 370/352 |
| 2004/0049736 A1 * | 3/2004 | Al-Azzawe et al. | ............... | 715/513 |
| 2004/0107183 A1 * | 6/2004 | Mangan | ............... | 707/2 |
| 2004/0162833 A1 * | 8/2004 | Jones et al. | ............... | 707/100 |
| 2004/0181537 A1 * | 9/2004 | Chawla et al. | ............... | 707/100 |
| 2005/0138160 A1 * | 6/2005 | Klein et al. | ............... | 709/223 |
| 2005/0235271 A1 * | 10/2005 | Sanyal et al. | ............... | 717/136 |
| 2007/0143337 A1 * | 6/2007 | Mangan | ............... | 707/102 |
| 2009/0192847 A1 * | 7/2009 | Lipkin et al. | ............... | 705/7 |

OTHER PUBLICATIONS

"B2B Solutions Using WebSphere Business Connection", Geert van de Putte, All Bouhouch, Vinay Choudhary, Reza Ghorieshi, Keera noor Kumar, Bhushan Mahashabde, Bhargava Rambabu Poludasu, Pushkar Suri, Madhavi Vemuri, Jul. 2003, pp. 198, 262, 263, 331, 568.*

* cited by examiner

*Primary Examiner*—Neveen Abel Jalil
*Assistant Examiner*—Tarek Chbouki
(74) *Attorney, Agent, or Firm*—Aka Chan LLP

(57) ABSTRACT

Techniques for providing type (and/or mode) conversion of parameters for software applications are provided. In general, a type conversion utility accesses a template that defines type and mode conversions for parameters between different components. The type conversion utility utilizes information stored in the template for that direct how the parameters will be converted. Additionally, techniques are provided for returning output values.

21 Claims, 27 Drawing Sheets webservices9.properties

```
##########################################################
JPublisher mapping for WebServices for 9.0.4 ###
##########################################################

INCLUDE webservices-common

OPTIONS
jpub.outarguments=return
jpub.plsqlfile=webservices9_wrapper.sql,webservices9_dropper.sql
END_OPTIONS TRANSFORMATION
MAPPING
SOURCETYPE oracle.sql.SimpleXMLType
TARGETTYPE org.w3c.dom.DocumentFragment
OUT
try
{
  javax.xml.parsers.DocumentBuilder db =
javax.xml.parsers.DocumentBuilderFactory.newInstance().newDocumentBuilder();
  %2 = null;
  if (%1!=null)
  {
    if (OC4JWsDebug()) System.out.println("WS Debug:
SimpleXMLType.getstringval() returns <" + %1.getstringval() + ">");
    org.w3c.dom.Document doc =db.parse(new
java.io.ByteArrayInputStream(%1.getstringval().getBytes()));
    %2 = doc.createDocumentFragment();
    %2.appendChild(doc.getDocumentElement());
  }
}
catch (java.lang.Throwable t)
{
  throw OC4JWsDebugPrint(t);
}
    USE OC4JWsDebug
END_OUT
IN
try
{
  javax.xml.transform.Transformer trans =
javax.xml.transform.TransformerFactory.newInstance().newTransformer();
  %1 = null;
  if (%2!=null)
  {
    javax.xml.transform.dom.DOMSource doms = new
javax.xml.transform.dom.DOMSource(%2.getFirstChild());
```

FIG. 7A

```
    java.io.ByteArrayOutputStream buf = new
java.io.ByteArrayOutputStream();
    javax.xml.transform.stream.StreamResult streamr = new
javax.xml.transform.stream.StreamResult(buf);
    trans.transform(doms, streamr);
    %1 = new %p.%c(_getConnection());
    String bufText = buf.toString();
    if (OC4JWsDebug()) System.out.println("WS Debug:
SimpleXMLType.createxml(" + bufText + ")");
    %1 = %1.createxml(bufText);
  }
}
catch (java.lang.Throwable t)
{
  throw OC4JWsDebugPrint(t);
}
    USE OC4JWsDebug
END_IN
END_MAPPING

END_TRANSFORMATION
```

FIG. 7B

```
                    webservices10.properties

###############################################
JPublisher mapping for WebServices ###
###############################################

INCLUDE webservices-common

OPTIONS
# jpub.outarguments=array|holder|return, DEFAULT is argument
jpub.outarguments=holder
jpub.plsqlfile=webservices10_wrapper.sql,webservices10_dropper.sql
END_OPTIONS TRANSFORMATION
This interface should be implemented/extended by
the methods in the user subclasses and interfaces
# This option takes no effect when subclass is not generated
SUBCLASS_INTERFACE java.rmi.Remote

# Each method in the interface and the user subclass should
# throw this exception (the default SQLException will be caught
# and re-thrown as an exception specified here)
# This option takes no effect when subclass is not generated
SUBCLASS_EXCEPTION java.rmi.RemoteException MAPPING
Handle OUT/INOUT using holders
This mapping is for primitive Java types SOURCETYPE int, char, byte, float, long, double,boolean,java.lang.String
For IN and RETURN arguments no change is necessary.

TARGETTYPE %p.%c

# For OUT and INOUT arguments we use the JAX-RPC holder
HOLDER javax.xml.rpc.holders.%CHolder
END_MAPPING MAPPING
Handle OUT/INOUT using holders
SOURCETYPE byte[]
# For IN and RETURN arguments no change is necessary.
TARGETTYPE byte[]

# For OUT and INOUT arguments we use the JAX-RPC holder
HOLDER javax.xml.rpc.holders.ByteArrayHolder
END_TARGETTYPE
END_MAPPING

MAPPING
```

FIG. 8A

```
# Handle OUT/INOUT using holders
This mapping is for several Java types

SOURCETYPE java.lang.Boolean, java.lang.Byte, java.lang.Short,
java.lang.Integer, java.lang.Long, java.lang.Double, java.lang.Float
# For IN and RETURN arguments no change is necessary.
TARGETTYPE %p.%c
# For OUT and INOUT arguments we use the JAX-RPC holder
HOLDER javax.xml.rpc.holders.%cWrapperHolder
END_TARGETTYPE
END_MAPPING MAPPING
Handle OUT/INOUT using holders
This mapping is for several Java types SOURCETYPE java.math.BigDecimal

For IN and RETURN arguments no change is necessary.
TARGETTYPE %p.%c

# For OUT and INOUT arguments we use the JAX-RPC holder
HOLDER javax.xml.rpc.holders.%cHolder
END_MAPPING MAPPING
SOURCETYPE oracle.sql.SimpleXMLType
TARGETTYPE oracle.sql.SimpleXMLType
END_MAPPING MAPPING
SOURCETYPE oracle.sql.SimpleXMLType
CONDITION javax.xml.transform.Source javax.xml.transform.dom.DOMSource
TARGETTYPE javax.xml.transform.Source
NEED_CONNECTION
OUT
try
{
  javax.xml.parsers.DocumentBuilder db =
javax.xml.parsers.DocumentBuilderFactory.newInstance().newDocumentBuilder();
  %2 = null;
  if (%1!=null)
  {
    org.w3c.dom.Document _tmpDocument_ = db.parse(new
java.io.ByteArrayInputStream(%1.getstringval().getBytes()));
    %2= new javax.xml.transform.dom.DOMSource(_tmpDocument_);
  }
}
catch (java.lang.Throwable t)
{
  throw OC4JWsDebugPrint(t);
```

FIG. 8B

```
}
END_OUT
IN
try
{
  javax.xml.transform.Transformer trans =
javax.xml.transform.TransformerFactory.newInstance().newTransformer();
  %1 = null;
  if (%2!=null)
  {
    java.io.ByteArrayOutputStream buf = new java.io.ByteArrayOutputStream();
    javax.xml.transform.stream.StreamResult streamr = new
javax.xml.transform.stream.StreamResult(buf);
    trans.transform(%2, streamr);
    %1 = new %p.%c(%x.getConnection());
    %1 = %1.createxml(buf.toString());
  }
}
catch (java.lang.Throwable t)
{
  throw OC4JWsDebugPrint(t);
}
END_IN
END_TARGETTYPE
USE OC4JWsDebug
END_MAPPING

END_TRANSFORMATION
```

FIG. 8C

```
webservices-common.properties

###################################################
Common JPublisher mapping for WebServices ###
###################################################

OPTIONS
jpub.filtertypes=1,.BFLOAT-,.BDOUBLE-,.ANYTYPE-,.ANYDATA-
jpub.adddefaulttypemap=SYS.XMLTYPE:oracle.sql.SimpleXMLType
jpub.adddefaulttypemap=BOOLEAN:java.lang.Boolean:INTEGER:SYS.SQLJUTL.INT2BOO
L:SYS.SQLJUTL.BOOL2INT
jpub.generatebean=true
jpub.compatible=ORAData
jpub.sqlstatement.return=both
jpub.genpattern=%2Base:%2User#%2
jpub.numbertypes=objectjdbc
jpub.builtintypes=jdbc
jpub.lobtypes=oracle
jpub.usertypes=oracle
jpub.methods=always,unique
jpub.stmtcache=0
END_OPTIONS TRANSFORMATION
IMPORT
# Ensure that the java.io.* package etc. is imported.
import java.io.*;
END_IMPORT oracle.sql.NString is not a Java bean
MAPPING
SOURCETYPE oracle.sql.NString
TARGETTYPE java.lang.String
OUT
if (%1==null)
{
  %2=null;
}
else
{
  %2=%1.toString();
}
END_OUT
IN
if (%2==null)
{
  %1 = null;
}
else
{
  %1 = new oracle.sql.NString(%2);
}
```

FIG. 9A

```
END_IN
END_MAPPING oracle.sql.CHAR is not a Java bean
MAPPING
SOURCETYPE oracle.sql.CHAR
TARGETTYPE java.lang.String
OUT
if (%1==null)
{
  %2=null;
}
else
{
  %2=%1.toString();
}
END_OUT
IN
if (%2==null)
{
  %1 = null;
}
else
{
  %1 = new oracle.sql.CHAR(%2, oracle.sql.CharacterSet.DEFAULT_CHARSET);
}
END_IN
END_MAPPING oracle.sql.NCHAR is not a Java bean
MAPPING
SOURCETYPE oracle.sql.NCHAR
TARGETTYPE java.lang.String
OUT
if (%1==null)
{
  %2=null;
}
else
{
  %2=%1.toString();
}
END_OUT
IN
if (%2==null)
{
  %1 = null;
}
else
{
  %1 = new oracle.sql.NCHAR(%2, oracle.sql.CharacterSet.DEFAULT_CHARSET);
}
```

FIG. 9B

```
END_IN
END_MAPPING

MAPPING
# Mapping CLOBS inlining CLOB data within SOAP envelope

SOURCETYPE oracle.sql.CLOB
TARGETTYPE java.lang.String
NEED_CONNECTION
OUT
if (%1==null)
{
   %2=null;
}
else
{
   %2=readerToString(%1.getCharacterStream());
}
    USE ReaderToString
END_OUT
IN
if (%2==null)
{
  %1 = null;
}
else
{
  try {
    %1 = oracle.sql.CLOB.createTemporary(%x.getConnection(),
false,oracle.sql.CLOB.DURATION_SESSION);
    populateClob(%1, %2);
  }
  catch (Throwable t)
  {
      throw OC4JWsDebugPrint(t);
  }
}
   USE PopulateClob
   USE OC4JWsDebug
END_IN
IN_AFTER_CALL
if (%1!=null) %1.freeTemporary();
END_IN_AFTER_CALL
END_MAPPING MAPPING
Mapping BLOBS inlining BLOB data within SOAP envelope

SOURCETYPE oracle.sql.BLOB
TARGETTYPE byte[]
NEED_CONNECTION
OUT
//Reading blob data into a byte stream
```

FIG. 9C

```
if (%1==null)
{
  %2 = null;
}
else
{
  java.io.InputStream ipstr = %1.getBinaryStream();
  %2=binaryContent(ipstr);
}
    USE ToByteArray
END_OUT
IN
%1 = null;
if (%2 != null)
{
  try
  {
    %1 = oracle.sql.BLOB.createTemporary(%x.getConnection(),
false,oracle.sql.BLOB.DURATION_SESSION);
    populateBlob(%1, %2);
  }
  catch (Throwable t)
  {
    throw OC4JWsDebugPrint(t);
  }
}
    USE PopulateBlob
    USE OC4JWsDebug
END_IN
IN_AFTER_CALL
if (%1!=null) %1.freeTemporary();
END_IN_AFTER_CALL
END_MAPPING MAPPING
Mapping BFILE

SOURCETYPE oracle.sql.BFILE
TARGETTYPE byte[]
OUT
%2 = null;
if (%1!=null)
{
  //Open the bfile
  %1.openFile();
  //Read bfile data into a stream
  java.io.InputStream ipstr = %1.getBinaryStream();
  //Convert stream into a byte array
  byte[] ba = binaryContent(ipstr);
  //Close bfile
  %1.closeFile();
  %2=ba;
}
    USE ToByteArray
```

FIG. 9D

```
END_OUT
//Disallow bfiles to be modified. They are read-only
IN_ERROR "Disallow BFILE from being modified. They are read only."
END_MAPPING MAPPING
SOURCETYPE oracle.sql.TIMESTAMPLTZ
TARGETTYPE java.util.Date
NEED_CONNECTION
OUT
%2 = null;
if (%1!=null)
{
  java.sql.Timestamp _ltz_as_jsts= null;
  try
  {
    _ltz_as_jsts =
oracle.sql.TIMESTAMPLTZ.toTimestamp(%x.getConnection(),%1.toBytes());
  }
  catch(Throwable e)
  {
    _ltz_as_jsts =
oracle.sql.TIMESTAMPLTZ.toTimestamp(%x.getConnection(),%1.toBytes(),
java.util.Calendar.getInstance());
  }
  %2=new java.util.Date(_ltz_as_jsts.getTime() + _ltz_as_jsts.getNanos()/
1000000) ;
}
END_OUT
IN
# Converting Date to TIMESTAMPLTZ
%1 = null;
if (%2!=null)
{
  java.sql.Timestamp _ltz_as_jsts = new java.sql.Timestamp(%2.getTime());
  //Prepare Connection sessionTimeZone for TIMESTAMPLTZ operations
  if (((oracle.jdbc.OracleConnection)
%x.getConnection()).getSessionTimeZone()==null)
  {
    java.sql.Statement __session_tz_stmt =
%x.getConnection().createStatement();
    java.sql.ResultSet __session_tz_rs =
__session_tz_stmt.executeQuery("select sessiontimezone from dual");
    __session_tz_rs.next();
    String __session_tz_name = __session_tz_rs.getString(1);
    __session_tz_stmt.close();
    __session_tz_rs.close();

((oracle.jdbc.OracleConnection)%x.getConnection()).setSessionTimeZone(__sess
ion_tz_name);
  }
  %1 = new oracle.sql.TIMESTAMPLTZ(%x.getConnection(), _ltz_as_jsts);
```

FIG. 9E

```
}
END_IN
END_MAPPING

MAPPING
# TIMESTAMP columns uses java.sql.Timestamp.
# For Web Services this is mapped to java.util.Date

SOURCETYPE java.sql.Timestamp
TARGETTYPE java.util.Date
OUT
%2 = null;
if (%1!=null) %2=new java.util.Date(%1.getTime() + %1.getNanos()/1000000) ;
END_OUT
IN
# Converting Date to Timestamp
%1 = null;
if (%2!=null) %1 = new java.sql.Timestamp(%2.getTime());
END_IN
END_MAPPING MAPPING
SOURCETYPE oracle.sql.SimpleXMLType
TARGETTYPE java.lang.String
NEED_CONNECTION
SimpleXMLType => String
OUT
%2 = null;
if (%1!=null) %2=%1.getstringval();
END_OUT
# String => SimpleXMLType
IN
%1 = null;
if (%2!=null)
{
  %1 = new %p.%c(%x.getConnection());
  %1 = %1.createxml(%2);
}
END_IN
END_TARGETTYPE
END_MAPPING MAPPING
SOURCETYPE java.sql.ResultSet
IN_ERROR "ResultSet may not be passed as IN argument due to JDBC limitation."
RETURN_ERROR ""
TARGETTYPE java.sql.ResultSet
RETURN
%2 = %1;
END_RETURN;
END_MAPPING
```

FIG. 9F

```
MAPPING
SOURCETYPE java.net.URL
TARGETTYPE java.lang.String
URL => String
OUT
%2 = null;
if (%1!=null) %2=%1.toString();
END_OUT
# String => URL
IN
%1 = null;
if (%2!=null)
{
  try
  {
    %1 = new java.net.URL(%2);
  }
  catch(java.net.MalformedURLException mu)
  {
    throw new java.sql.SQLException("Invalid URL string: " + %2);
  }
}
END_IN
END_TARGETTYPE
END_MAPPING

DEFAULT_HOLDER

HOLDER %*.%C%]Holder GENERATE %C%]Holder.java
        // Holder class for %p.%c
        package %*;
        public class %C%]Holder implements javax.xml.rpc.holders.Holder
        {
            public %p.%c%[ value;
            public %C%]Holder() { }
            public %C%]Holder(%p.%c%[ value) { this.value = value; }
        }
END_HOLDER OUT_BEFORE_CALL
    // allocate an array for holding the OUT value
    %2 = new %p.%c[1]%[;
END_OUT_BEFORE_CALL
INOUT_BEFORE_CALL
    // allocate an array for holding the OUT value
    %2 = new %p.%c[1]%[;
    if (%1!=null) %2[0] = %1.value;
END_INOUT_BEFORE_CALL
OUT
    // convert OUT value to a holder
    if (%2!=null) %1.value = %2[0];
END_OUT
```

FIG. 9G

```
END_DEFAULT_HOLDER
###
Definition Sections ###
###

DEFINE ToByteArray private byte[] binaryContent(java.io.InputStream ipstr)
throws java.sql.SQLException
{
  byte[] ba = null;
  try
    {

ByteArrayOutputStream bos = new ByteArrayOutputStream();

int maxlen = 4096;

byte [] tmpbuf = new byte[maxlen] ;

int numBytes;

int  offset = 0;

boolean done = false;

while(!done)
            { numBytes = ipstr.read(tmpbuf,0, maxlen);
               if (numBytes == -1)
                 done= true;
               else
                 {
                    bos.write(tmpbuf,0,numBytes);
                 }

}
        ba = bos.toByteArray();

}
  catch(Throwable t)
    {
       throw OC4JWsDebugPrint(t);
    }
   return ba;
}
   USE OC4JWsDebug
END_DEFINE DEFINE ReaderToString
 private java.lang.String readerToString(java.io.Reader r)
```

FIG. 9H

```
      throws java.sql.SQLException
{
    CharArrayWriter caw = new CharArrayWriter();
    try
      {
        //Read from reader and write to writer
        boolean done = false;
        while (!done)
        {
                char[] buf = new char[4096];
                int len = r.read(buf, 0, 4096);
                if(len == -1)
                {
            done = true;
            }
            else
            {
            caw.write(buf,0,len);
            }
        }
      }
      catch(Throwable t)
      {
        throw OC4JWsDebugPrint(t);
      }
      return caw.toString();
}
    USE OC4JWsDebug
END_DEFINE DEFINE PopulateClob
    private void populateClob(oracle.sql.CLOB clb, java.lang.String data)
         throws Exception
    {
      java.io.Writer writer = clb.getCharacterOutputStream();
      writer.write(data.toCharArray());
      writer.flush();
      writer.close();
    }
END_DEFINE DEFINE PopulateBlob
    private void populateBlob(oracle.sql.BLOB blb, byte[] data)
         throws Exception
    {
     java.io.OutputStream os = blb.getBinaryOutputStream();
     os.write(data);
     os.flush();
     os.close();
    }
END_DEFINE
```

FIG. 9I

```
DEFINE OC4JWsDebug
    private boolean OC4JWsDebug()
    {
      boolean debug = false;
      try {
        // Server-side Debug Info for "java -Dws.debug=true -jar oc4j.jar"
      Class sutil = Class.forName("com.evermind.util.SystemUtils");
      java.lang.reflect.Method getProp = sutil.getMethod("getSystemBoolean",
new Class[]{String.class, Boolean.TYPE});
      if (((Boolean)getProp.invoke(null, new Object[]{"ws.debug",
Boolean.FALSE})).booleanValue())
      {
        debug = true;
      }
      } catch (Throwable except2) {}
      return debug;
    }
    private java.sql.SQLException OC4JWsDebugPrint(Throwable t)
    {
      java.sql.SQLException t0 = new java.sql.SQLException(t.getMessage());
      if (!OC4JWsDebug()) return t0;
      t.printStackTrace();
      try
      {
        java.lang.reflect.Method getST =
Exception.class.getMethod("getStackTrace", new Class[]{});
        java.lang.reflect.Method setST =
Exception.class.getMethod("setStackTrace", new Class[]{});
        setST.invoke(t0, new Object[]{getST.invoke(t, new Object[]{})});
      }
      catch (Throwable th){}
      return t0;
    }
END_DEFINE

END_TRANSFORMATION
```

FIG. 9J

Table 2-1 SQL and PL/SQL Datatype to Oracle and JDBC Mapping Classes

| SQL and PL/SQL Datatype | Oracle Mapping | JDBC Mapping |
|---|---|---|
| CHAR, CHARACTER, LONG, STRING, VARCHAR, VARCHAR2 | oracle.sql.CHAR | java.lang.String |
| NCHAR, NVARCHAR2 | oracle.sql.NCHAR (note 1) | oracle.sql.NString (note 1) |
| NCLOB | oracle.sql.NCLOB (note 1) | oracle.sql.NCLOB (note 1) |
| RAW, LONG RAW | oracle.sql.RAW | byte[] |
| BINARY_INTEGER, NATURAL, NATURALN, PLS_INTEGER, POSITIVE, POSITIVEN, SIGNTYPE, INT, INTEGER | oracle.sql.NUMBER | int |
| DEC, DECIMAL, NUMBER, NUMERIC | oracle.sql.NUMBER | java.math.BigDecimal |
| DOUBLE PRECISION, FLOAT | oracle.sql.NUMBER | double |
| SMALLINT | oracle.sql.NUMBER | int |
| REAL | oracle.sql.NUMBER | float |
| DATE | oracle.sql.DATE | java.sql.Timestamp |
| TIMESTAMP | oracle.sql.TIMESTAMP | java.sql.Timestamp |
| TIMESTAMP WITH TZ | oracle.sql.TIMESTAMPTZ | |
| TIMESTAMP WITH LOCAL TZ | oracle.sql.TIMESTAMPLTZ | |
| INTERVAL YEAR TO MONTH INTERVAL DAY TO SECOND | String (note 2) | String (note 2) |
| URITYPE DBURITYPE XDBURITYPE HTTPURITYPE | java.net.URL (note 3) | java.net.URL (note 3) |
| ROWID, UROWID | oracle.sql.ROWID | oracle.sql.ROWID |
| BOOLEAN | boolean (note 4) | boolean (note 4) |
| CLOB | oracle.sql.CLOB | java.sql.Clob |
| BLOB | oracle.sql.BLOB | java.sql.Blob |
| BFILE | oracle.sql.BFILE | oracle.sql.BFILE |
| Object types | Generated class | Generated class |
| SQLJ object types | Java class defined at type creation | Java class defined at type creation |
| OPAQUE types | Generated or predefined class (note 5) | Generated or predefined class (note 5) |
| RECORD types | Through mapping to SQL object type (note 6) | Through mapping to SQL object type (note 6) |
| Nested table, VARRAY | Generated class implemented using oracle.sql.ARRAY | java.sql.Array |
| Reference to object type | Generated class implemented using oracle.sql.REF | java.sql.Ref |
| REF CURSOR | java.sql.ResultSet | java.sql.ResultSet |

FIG. 10A

JPublisher Datatype Mappings

Table 2-1 (Cont.) SQL and PL/SQL Datatype to Oracle and JDBC Mapping Classes

| SQL and PL/SQL Datatype | Oracle Mapping | JDBC Mapping |
|---|---|---|
| Indexed-by tables | Through mapping to SQL collection (note 7) | Through mapping to SQL collection (note 7) |
| Scalar (numeric or character) Indexed-by tables | Through mapping to Java array (note 8) | Through mapping to Java array (note 8) |
| User-defined subtypes | Same as for base type | Same as for base type |

FIG. 10B

| Table 2-2 Summary of Java-to-Java Type Mappings in Oracle Style Files | |
|---|---|
| Source Type | Target Type |
| oracle.sql.NString | java.lang.String |
| oracle.sql.CLOB | java.lang.String |
| oracle.sql.BLOB | byte[] |
| oracle.sql.BFILE | byte[] |
| java.sql.Timestamp | java.util.Date |
| java.sql.ResultSet | oracle.jdbc.rowset.OracleWebRowSet |
| | org.w3c.dom.Document |
| | javax.xml.transform.Source |
| oracle.sql.SimpleXMLType | java.lang.String (webservices-common) |
| | org.w3c.dom.DocumentFragment (webservices9) |
| | javax.xml.transform.Source (webservices10) |

FIG. 11

TEMPLATE DRIVEN TYPE AND MODE CONVERSION

This application claims priority to U.S. Provisional Application 60/570,344, filed May 12, 2004, which is hereby incorporated by reference for all purposes.

BACKGROUND OF THE INVENTION

The present invention relates to computer systems. More specifically, the invention relates to providing template driven type and mode conversion for parameters in software applications.

Soon after the development of programming languages for computers, the concept of modular programming was developed. Modular programming encourages designing and writing programs as interactions among functions where each performs a single well-defined function.

For example, a call is made to a function. The function call typically specifies one or more parameters (or arguments). Each parameter has a specified type, which defines the meaning of the value of the parameter. The one or more bits passed in as a parameter are interpreted according to the format specified by the type (e.g., integer, floating point, string). In modern programming languages, there are a myriad of different types specified by standards, but the type refers to the format that should be utilized to give the bits meaning and therefore their value.

Parameters can also have different modes. The mode defines the relationship of the parameter between the caller and the callee (or function). For example, an "in" parameter is a parameter that is an input to the function. Even if the function modifies the parameter during execution, the modification will not affect the parameter from the caller's end.

An "out" parameter is a parameter that is an output of the function. Typically, the caller provides a pointer to a memory location (e.g., address) and the function writes the return value at that location. As with "in" parameters, the format of the parameter is specified by the type. Lastly, an "in out" parameter is one that is both an input and an output.

The above describes the basic initial concepts, but it may be beneficial to describe a typical, more complex application. FIG. 1 shows a database environment that uses different interfaces between components. A database 11 includes the hardware and software for performing, among other things, database queries. A Java virtual machine 13 executes computer programs that can interact with database 11.

As shown, Java Database Connectivity ("JDBC") provides Application Programming Interfaces ("APIs") for Java that supports Structure Query Language ("SQL") commands to database 11. Additionally, SQLJ can be utilized to embed SQL statements in Java source code that interacts with JDBC. As is known, the APIs for JDBC have a defined call structure including parameter types and modes.

As shown, web services 15 of a web server communicates with Java virtual machine 13 utilizing Apache web service types and modes. Extensible Markup Language ("XML") 17 is utilized to communicate input and output to web services 15 as specified by XML schemas.

Database 11 may have stored procedures that it would be desirable to access from web services 15. However, there may be call mismatches, such as parameter type and mode, that make this difficult. For example, the Oracle database system has stored procedures written in Procedural Language extensions to SQL ("PL/SQL"), which is different than web service types such as XML values used by Apache. A conversion may need to be performed in order to allow calls from web services 15 to stored procedures in database 11.

Additionally, PL/SQL supports parameters of in, out and in out. However, JDBC that provides calling mechanisms to database 11 sends a copy of each parameter. If the parameter is modified, a copy of the modified parameter is returned. Thus, the "before" and "after" values of the parameter appear in separate objects. This creates a mode inconsistency between these parameters.

One solution is for the programmer to manually write Java classes in order to allow access (or publish) to the stored procedures in database 11 by web services 15. Unfortunately, this solution is very time consuming and prone to errors.

A utility know as JPublisher has been developed by Oracle Corporation in order to, among other things, facilitate accessing SQL objects and PL/SQL in database 11. Although JPublisher has met with extreme success, interfaces to PL/SQL procedures are still manually created in many cases because the data types used by JDBC, and the way in which "out" or "in out" arguments are treated necessitates writing code by hand to match the intended usage.

Accordingly, it would be beneficial to have innovative techniques automatically publishing stored procedures of a database for use by other applications. Additionally, it would be beneficial to provide type and mode conversions where desired.

SUMMARY OF THE INVENTION

The present invention provides innovative techniques for providing type and/or mode conversion of parameters for software applications. In general, a type conversion utility accesses a template that defines type and mode conversions for parameters. The type conversion utility utilizes information stored in the template that direct how the parameters will be converted. This provides great flexibility in publishing procedures and can be done efficiently as the manual writing code for this purpose is not necessary. The main use of the application is in the type and mode conversions between different models for desired type and mode representations. It encompasses different models between different programming languages, as well as different models of type and mode mapping in the same programming language. Some specific embodiments of the invention are described below.

In one embodiment, the invention provides a method of converting types of parameters between two applications utilizing different types. A first type is received for a parameter from a first application to be sent to a second application utilizing different types. A template is retrieved that specifies a conversion of the first type to a second type for the second application. The first type is converted to the second type as specified in the template and the parameter is passed to the second application as the second type. In addition, a returned data type can be converted as specified in the template.

In another embodiment, the invention provides a method of returning an output value as a parameter. An array is declared and a before value of a parameter is assigned to an element of the array. The array is passed to a wrapper method. An underlying method of the wrapper method is then executed. An after value of the parameter is assigned to an element of the array. Lastly, the after value of the parameter is extracted from the array.

An embodiment of the invention in the JPublisher product utilizes this template-driven mechanism to create Java language sources that implement an API for invoking stored procedures running in an Oracle database and implemented in PL/SQL. The advantage of the template mechanism lies in the fact that different mode and type models can be mapped, simply and quickly by switching, modifying, or extending the template. This invention is not limited to a particular programming language, to particular type models, or to particular models for representing modes.

Other features and advantages of the invention will become readily apparent upon review of the following description and association with the accompanying drawings, where the same or similar structures are designated with the same reference numerals.

BRIEF DESCRIPTION OF THE DRAWINGS

FIGS. 7A and 7B show an example template for webservices 9.

FIGS. 8A-8C show an example template for webservices 10.

FIGS. 9A-9J show an example template for common properties of web services.

FIGS. 10A and 10B show an example of a table of mapping datatypes (source) to one or more other datatypes (targets).

FIG. 11 shows an example of a table of source type to target type mappings for a template (or style) file.

DETAILED DESCRIPTION OF PREFERRED EMBODIMENTS

In the description that follows, the present invention will be described in reference to embodiments that provide template driven type and mode conversion for software applications. Additionally, embodiments will be described in terms of a three-tiered database architecture such as is available from Oracle Corporation, Redwood Shores, Calif. However, embodiments of the invention are not limited to any particular architecture, language, environment, application, or implementation. For example, although some embodiments utilize stored procedures in specific languages, the invention can be advantageously applied to any programming language or environment. Therefore, the description of the embodiments that follows is for purposes of illustration and not limitation.

Figure 2:
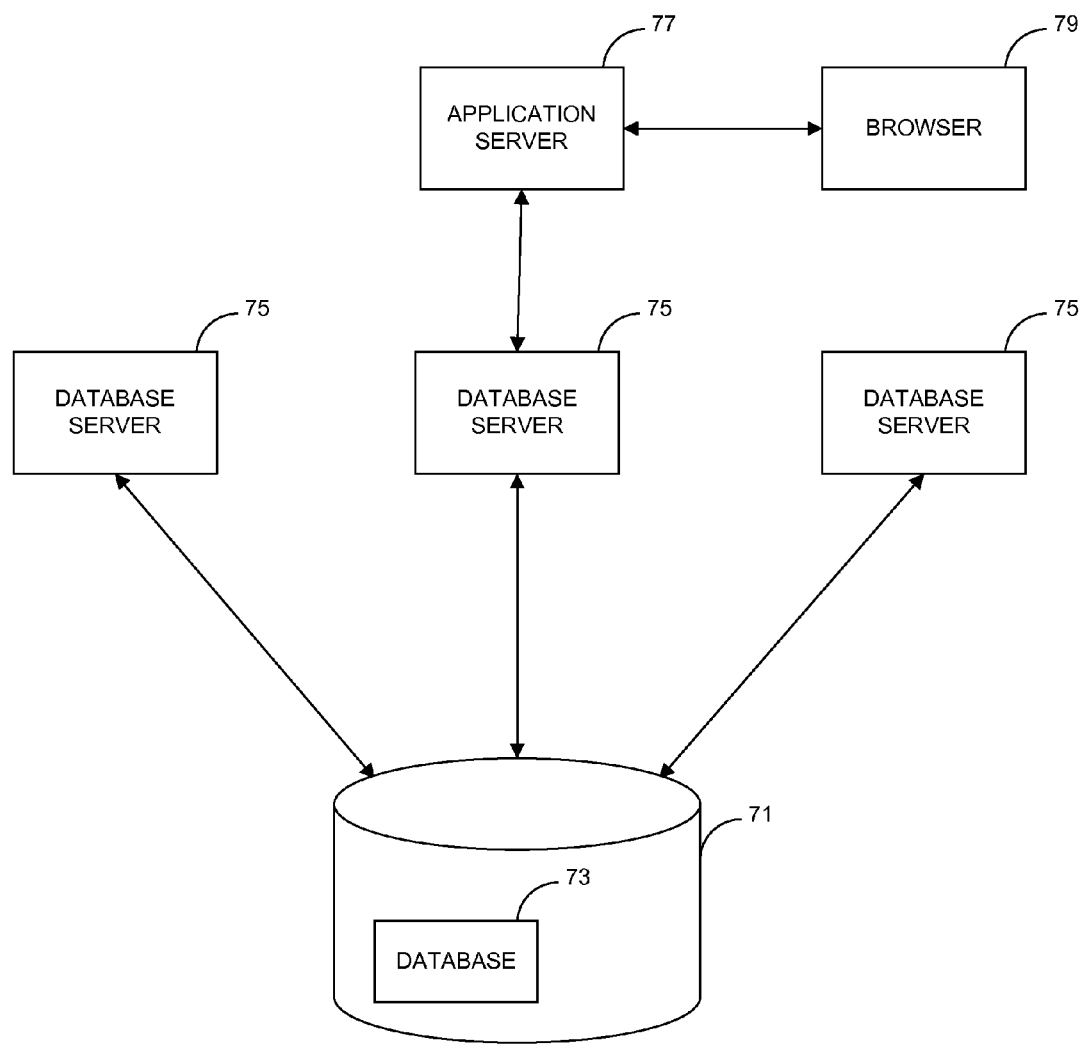
FIG. 2 shows an example of a three-tiered architecture for a database management system.

A fairly common database management system architecture is the three-tiered architecture that is shown in FIG. 2. At the core of the database management system is a central storage 71 that stores a database 73. Database 73 is typically stored on one or more hard drives, which is typically part of a larger computer system. The information can be stored on database 73 in a variety of formats with relational database management systems relying heavily on tables to store the information.

Database servers 75 are instances of a program that interacts with database 73. Each instance of the database server can, among other things, independently query database 73 and store information therein. Database servers 75 may not include user friendly interfaces to access database 73. Database 73 and database servers 75 comprise the lowest tier of the hierarchy.

One or more application server 77 can provide the user interfaces to database server 75. For example, application server 77 can be a web application server on the Internet (or other network). Application server 77 can accept commands from users for accessing database 73 through database server 75. As an example, application server 77 can be an SQL server. Thus, application server 77 is in the middle tier of the hierarchy.

Although application server 77 can accept user commands, a web browser 79 (or other client application) can be utilized to access application server 77 through a user-friendly interface. Web browser 79 is an example of an application in the highest tier in the hierarchy.

Figure 3:
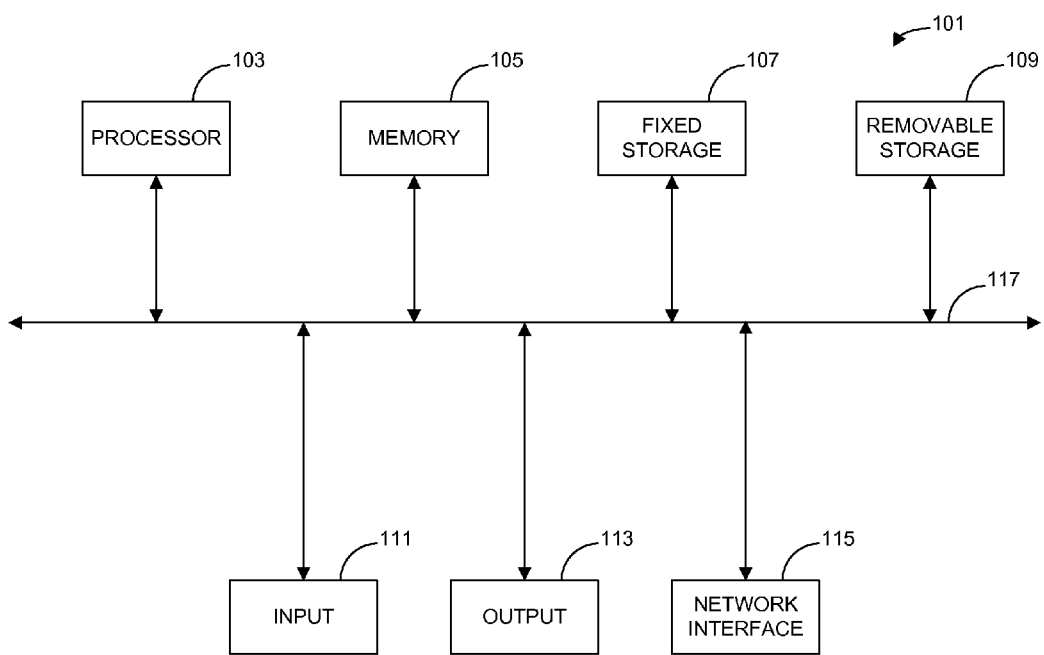
FIG. 3 illustrates a block diagram of a computer system that can be utilized in association with embodiments of the invention.

FIG. 3 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage for databases is multiple (e.g., arrays) hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of computer readable storage media that can be utilized to store and retrieve computer programs incorporating computer codes that implement the invention, data for use with the invention, and the like. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 15 allows the system to interface with a network to which it is connected. The system bus architecture of computer system 101 is represented by arrows 117. The components shown in FIG. 3 can be found in many computer systems. However, components can be added, deleted and combined. For example, fixed storage 107 could be a file server that is accessed through a network connection. Thus, FIG. 3 is for illustration purposes and not limitation.

Now that exemplary database applications and environments have been described, it may be beneficial to discuss embodiments of the invention. Although specific embodiments are described, features can be added and combined without departing from the spirit and scope of the invention. For example, features from more than one of the embodiments can be advantageously implemented in other embodiments.

Embodiments of the invention can convert simultaneously both, modes of parameters between two different models of representing modes, as well as types of parameters between two different models of representing types. The "outer function" will refer to the function that utilizes the first (or "outer") parameter type and mode model. The "inner function" will refer to the function that utilizes the second (or "inner") parameter type and mode model. A template is used for driving the automatic creation of an application that implements the outer function and that in turn invokes the inner function.

The following describes the principles for conversion between parameter types in the first (outer) model and parameter types in the second (inner) model. For every parameter type or possibly sets of parameter types in the outer model, the template includes, among others, definitions of the following:

- a programming language expression with a placeholder for a parameter value in the outer type model, which, when executed, takes a parameter value in the outer type model and evaluates to a corresponding parameter value in the inner type model. This expression can be called the "outer-to-inner conversion expression."
- a programming language expression with a placeholder for a parameter value in the inner type model, which, when executed, takes a parameter value in the inner type model and itself evaluates to a corresponding parameter value in the outer type model. This expression can be called the "inner-to-outer conversion expression."

The following further describes embodiments of the invention in terms of some of the various outer parameter mode models.

In one embodiment of the invention the inner parameter mode model utilizes arrays to represent "out" or "in out" values. In that particular embodiment the inner parameter mode and type model may, for example, utilize a particular style of Java code generated for invoking PL/SQL stored procedures in an Oracle database via JDBC.

Figure 4:
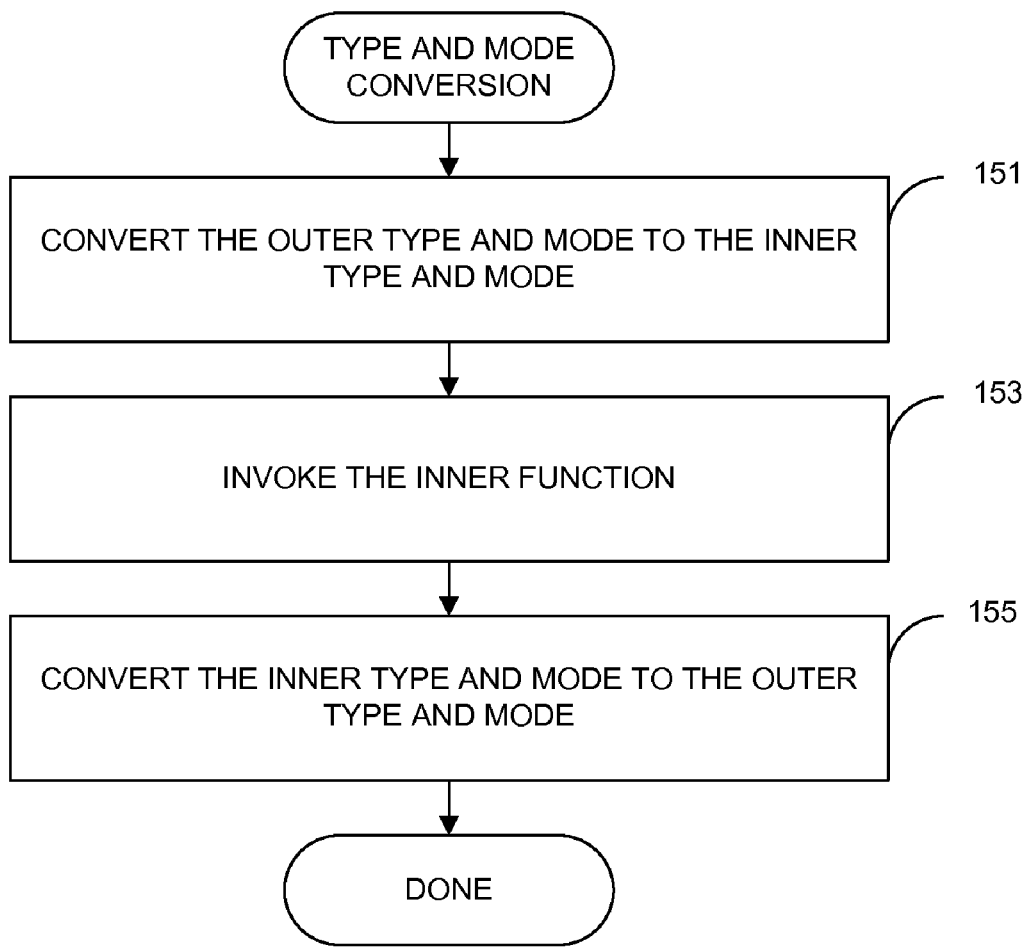
FIG. 4 shows a flowchart of a process of converting outer type and mode to inner type and mode for invoking an inner function and includes the conversion back.

FIG. 4 shows a flowchart of a process of converting outer type and mode to inner type and mode for invoking an inner function. As shown, at a step 151, the conversion between the outer type and mode to the inner type and mode is performed, and thus the code is generated. The inner function is invoked at a step 153. At a step 155, the conversion from the inner type and mode back to the outer type and mode is performed, and thus the code generated.

Although FIG. 4 shows both a type and mode conversion, embodiments can implement type or mode conversion. The following will describe different variants of the steps of FIG. 4 in more detail.

A first variant of step 151 is described herein. The following description of the template-driven conversion process of will be common when the inner parameter mode utilizes arrays to represent "out" or "in out" values. For parameters with "out" or "in out" modes, a one-element array of type array parameter type of inner type model is declared. For parameters with "in" modes, a variable of type parameter type of inner type model is declared instead. The outer-to-inner conversion expression is constructed as follows:

- if the parameter mode is "in", pass in the outer parameter to the outer-to-inner conversion expression
- if the outer parameter mode model uses return values only, and the parameter mode is "in out", pass in the outer parameter to the outer-to-inner conversion expression
- if the outer parameter mode model uses holders for "out" and for "in out" arguments and the parameter mode is "out" or "in out"
  - if there is no predefined or previously defined holder type for the corresponding outer parameter type, create the appropriate outer holder type
  - the parameter passed in to the outer method is of corresponding holder type
  - create an expression that extracts the underlying value from the parameter (which is a holder); this expression is passed into the outer-to-inner conversion expression.
- if the outer parameter mode model uses one element arrays for "out" and for "in out" arguments and the parameter mode is "out" or "in out"
  - the parameter passed in to the outer method is of corresponding array type
  - create an expression that extracts the first element from the parameter (which is an array); this expression is passed to the outer-to-inner conversion expression The value returned by the outer-to-inner conversion expression is then is assigned to the first element of the array, or respectively to the variable that represents the corresponding parameter. Note that for all "out" parameters no conversion expression value is assigned, but the one-element array is directly passed in, using its default value. These constitute the "before value" for all parameters. Then the inner function is invoked, passing in the respective before values in the form of arrays and variables. The inner function returns.

A second variant of step 151 is described herein. The following description of the template-driven conversion process will be common when the inner parameter mode utilizes holders to represent "out" or "in out" values. For parameters with "out" or "in out" modes, a corresponding holder instance of parameter type of inner type model is defined. If the holder type of parameter type of inner type model is neither predefined nor previously defined, then define it. For parameters with "in" modes, a variable of type parameter type of inner type model is declared instead. The outer-to-inner conversion expression is constructed as follows:

- if the parameter mode is "in", pass in the outer parameter to the outer-to-inner conversion expression
- if the outer parameter mode model uses return values only, and the parameter mode is "in out", pass in the outer parameter to the outer-to-inner conversion expression; then apply holder construction for the holder of parameter type of inner type model on the value obtained by the conversion.
- if the outer parameter mode model uses holders for "out" and for "in out" arguments and the parameter mode is "out" or "in out"
  - if there is no holder type for the corresponding outer parameter type that is predefined or that has previously been defined, then create the appropriate outer holder type
  - the parameter passed in to the outer method is of corresponding holder type
  - create an expression that extracts the underlying value from the parameter (which is a holder); this expression is passed into the outer-to-inner conversion expression.
- if the outer parameter mode model uses one element arrays for "out" and for "in out" arguments and the parameter mode is "out" or "in out"
  - the parameter passed in to the outer method is of corresponding array type create an expression that extracts the first element from the parameter (which is an array); this expression is passed to the outer-to-inner conversion expression The outer-to-inner conversion expression is then is assigned to the inner parameter holder, or respectively to the variable. Note that for all "out" parameters no conversion expression value is assigned, but a corresponding default holder instance is directly passed in. These constitute the "before value" for all parameters. Then the inner function is invoked, passing in the respective before values in the form of holders and variables. The inner function returns.

A third variant of step 151 is described herein. The following description of the template-driven conversion process will be common when the inner parameter mode utilizes a compound return type to represent "out" and "in out" values as well as a return value (if any). For parameters with "out" or "in out" modes and for the return value, a corresponding compound type is declared. This compound type holds instances (fields, attributes) for each "out" and "in out" parameter is of type parameter type of inner type model. If the inner function returns a value, then this compound type also holds an instance for the return value of type return type of inner type model. Typically, the names of the instances (attributes, fields) of this compound type could be derived from the parameter names. For parameters with "in" modes and for parameters with "in out" modes a variable of type parameter type of inner type model is declared. The outer-to-inner conversion expression is constructed as follows:

if the parameter mode is "in", pass in the outer parameter to the outer-to-inner conversion expression if the outer parameter mode model uses return values only, pass in the outer parameter to the outer-to-inner conversion expression;

if the outer parameter mode model uses holders for "out" and for "in out" arguments and the parameter mode is "out" or "in out"

if there is no holder type for the corresponding outer parameter type that is predefined or that has previously been defined, then create the appropriate outer holder type the parameter passed in to the outer method is of corresponding holder type create an expression that extracts the underlying value from the parameter (which is a holder); this expression is passed into the outer-to-inner conversion expression.

if the outer parameter mode model uses one element arrays for "out" and for "in out" arguments and the parameter mode is "out" or "in out"

the parameter passed in to the outer method is of corresponding array type create an expression that extracts the first element from the parameter (which is an array); this expression is passed to the outer-to-inner conversion expression The outer-to-inner conversion expression is then is assigned to the inner variables. This constitutes the "before value". Then the inner function is invoked, passing in the respective before values in the form variables. The inner function returns with a compound return type holding all returned "out" and "in out" values, as well as the return value, if any.

At step 153, the inner-to-outer conversion expression for all "out" and "in out" parameters and the return, if any, of the inner method, is constructed similarly to what was described earlier. This time, the inner placeholder in the inner-to-outer conversion expression is replaced by the "after value." The "after value" is obtained as follows. In the particular case where the inner parameter mode uses one-element arrays to represent "out" and "in out" arguments, the "after value" is obtained by accessing the first element of the array. In the particular case where the inner parameter mode uses holders to represent "out" and "in out" arguments, the "after value" is obtained by retrieving the underlying value in the holder. In both of these cases, the return value (if any) is directly retrieved from the invoked function. In the case where the inner parameter mode uses the return value to represent "out" and "in out" arguments, a structured type with components consisting of an attribute for the return value (if any), and an attribute each for all "out" and "in out" parameter values would be returned, and the "after value" is obtained by accessing the specific return or parameter attribute.

The following describe cases for the outer parameter mode model for "out" and "in out" parameters.

If the model uses one-element arrays, then, for outer parameters with "out" or "in out" modes, an outer parameter of type array of outer parameter type exists on the outer method. Each of these parameters is initialized to a one-element array with the first array element containing the value of the inner-to-outer conversion expression as constructed above for the corresponding inner parameter. The outer function then returns the inner-to-outer conversion expression as constructed above for the return value, if any.

If the model uses holder types, then, for outer parameters with "out" or "in out" modes, a corresponding variable of type outer Holder type is declared as a method parameter on the outer method. If the outer Holder type does not exist, then it will be created and declared elsewhere. For the return value, if any, a return variable of type outer return type is declared. Each of the outer parameter holders is assigned the corresponding inner-to-outer conversion expression. The method then returns the inner-to-outer conversion expression as constructed above for the return value.

If the model uses a single return type, then we expect a constructor method for the complex outer return type to have been created. If there is any return, or "out", or "in out" parameter, then declare a return variable of type complex outer return type. Initialize the return variable through invoking the complex return type constructor, passing it the inner-to-outer conversion expression for the return value, as well as the inner-to-outer conversion expressions for the "out" and "in out" parameters, respectively. Return the return variable from the outer method.

Figure 1:
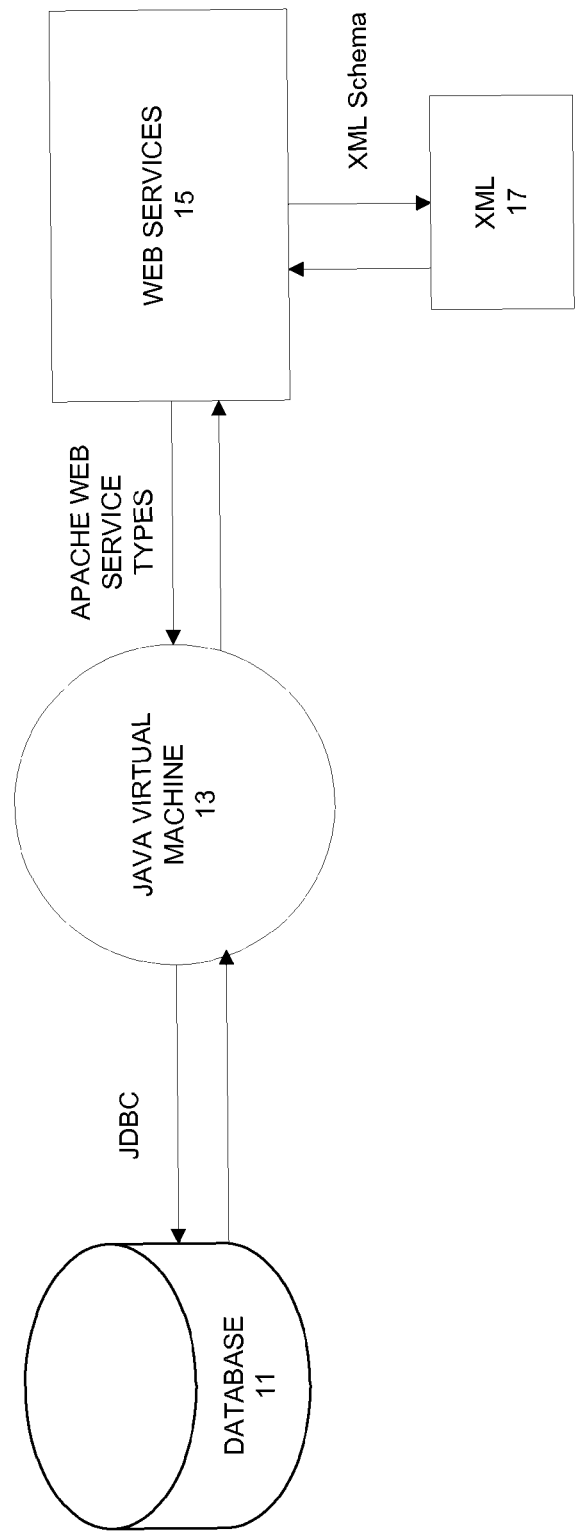
FIG. 1 shows a database environment that uses different interfaces between components.
Figure 5:
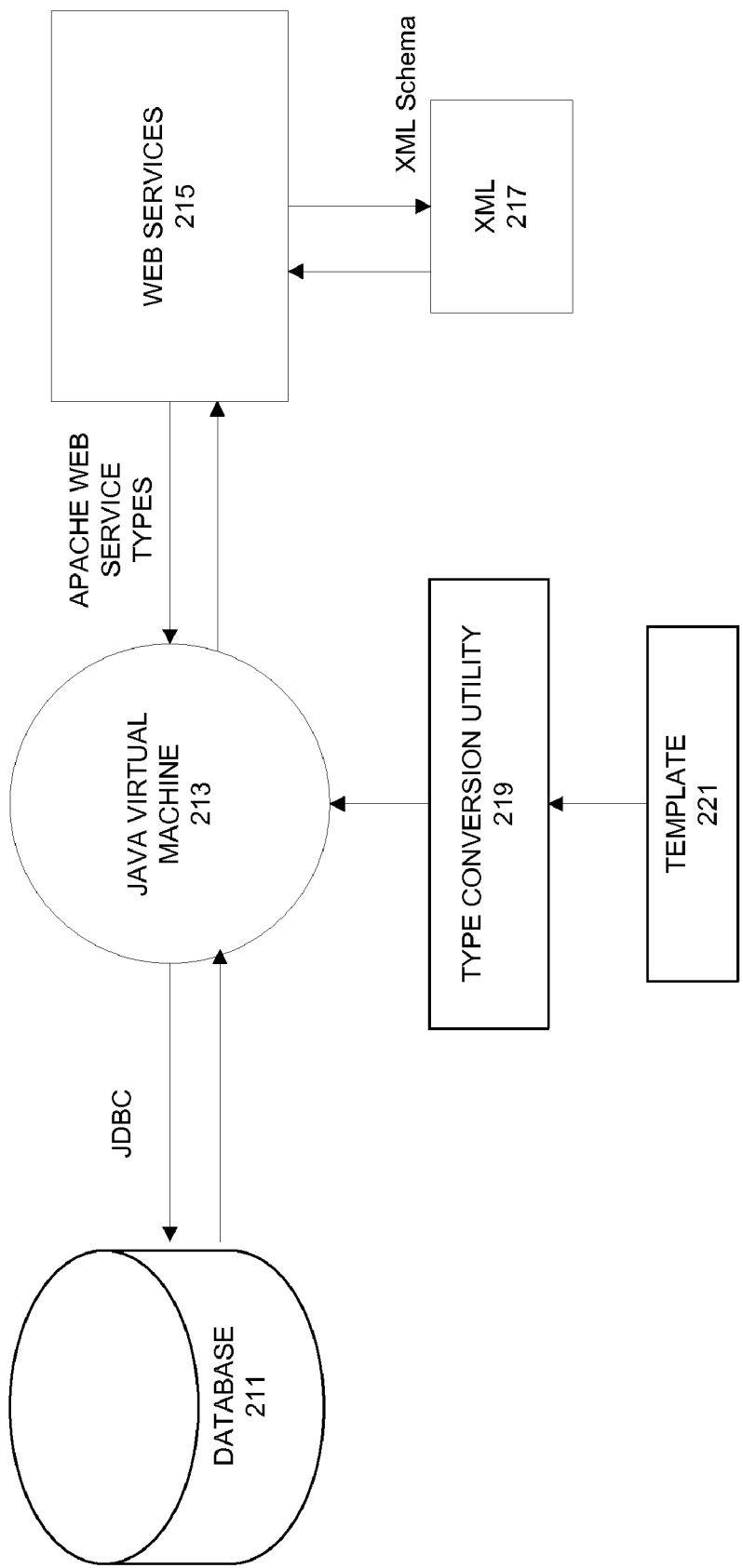
FIG. 5 shows an embodiment of the invention where a type conversion utility accesses a template to perform type and/or mode conversions of parameters between components that use different interfaces.

FIG. 5 shows a database environment that uses different interfaces between components as in FIG. 1, but includes an embodiment of the invention that is a type conversion utility that accesses a template. A database 211 includes the hardware and software for performing, among other things, database queries. A Java virtual machine 213 executes computer programs that can interact with database 211.

As shown, Java Database Connectivity ("JDBC") provides Application Programming Interfaces ("APIs") for Java that supports Structure Query Language ("SQL") commands to database 11. Additionally, SQLJ can be utilized to embed SQL statements in Java source code that interacts with JDBC. As is know, the APIs for JDBC have a defined call structure including parameter types and modes.

Web services 215 of a web server communicate with Java virtual machine 213 and XML 217 is utilized to communicate input and output to web services 215 as specified by XML schemas.

A type conversion utility 219 is responsible for performing type and/or mode conversions of parameters as specified by a template 221. As will be described below, there may be multiple templates, but one is shown for simplicity.

Type conversion utility 219 can be written in the Java programming language and therefore interact with Java virtual machine 213. However, the type conversion utility can be implemented in any programming language. Template 221 specifies, among other things, mappings between source types and target types. Additionally, template 221 can include computer code for performing actions for the conversion, where desired.

Thus, stored procedures on database 211 may be conveniently published through wrapper methods (a wrapper method "wraps" an underlying method and may include computer code before and/or after the call to the underlying method) by specifying type conversions for the stored procedures in template 221. As web services 215 access the stored procedures through the wrapper methods, type conversion is provided as specified in template 221.

Figure 6:
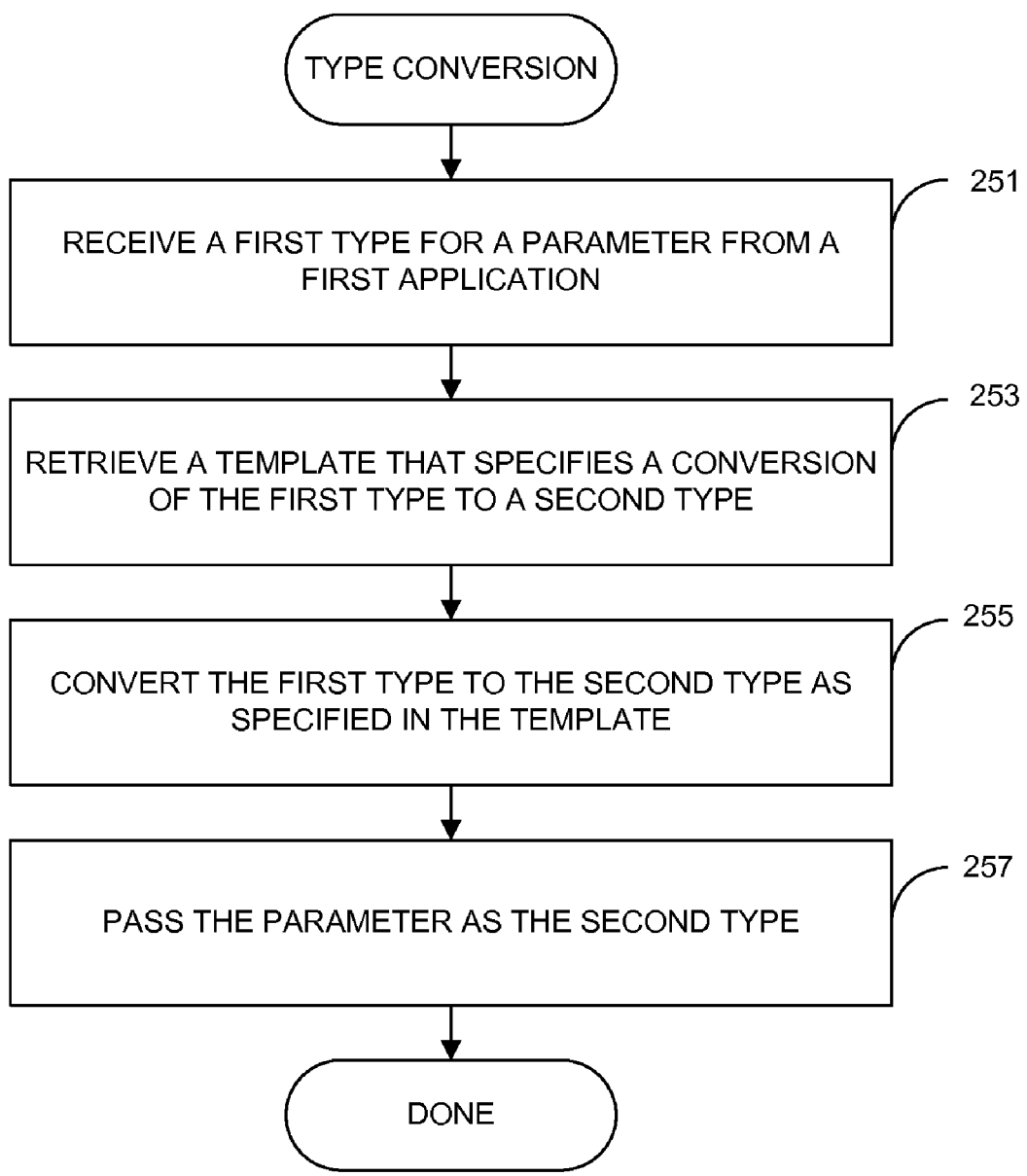
FIG. 6 shows a flowchart of a process of performing type conversion using a template.

FIG. 6 shows a flowchart of a process of performing type conversion utilizing a template, which in some embodiments utilize a wrapper method. As with all flowcharts shown here, steps can be added, deleted, combined, and reordered without departing from the spirit and scope of the invention.

At a step 251, a first type for a parameter from a first application is received. The parameter is to be sent to a second application that utilizes different types than the first application. A template is retrieved that specifies a conversion of the first type to a second type for the second application at a step 253. The template can specify mappings from source types to target types.

The first type is converted to the second type as specified in the template at a step 255. At a step 257, the parameter is passed to the second application as the second type. Although the flowchart in FIG. 6 is directed to type conversions, a similar process can be performed for mode conversions, which can also be specified in a template.

After the second application finishes, the return data from the second application, if any and if necessary, is converted to a type that is supported by the first application. Such mapping, from the target type to the source type, is also defined in the template.

An embodiment of the invention can be implemented in the JPublisher utility (from Oracle Corporation) that uses the Oracle SQLJ ("SQL in Java") implementation, generating SQLJ code as an intermediate step in most circumstances—whenever wrapper methods are created, either for classes representing PL/SQL packages or for classes representing SQL object types that define methods (PL/SQL stored procedures). In these circumstances, JPublisher uses the Oracle SQLJ translator during compilation, and the Oracle SQLJ runtime during program execution. In addition to mapping SQL objects, the entire PL/SQL packages can be encapsulated as Java classes. JPublisher offers functionality to create Java wrapper methods for the stored procedures of a PL/SQL package.

The concept of representing PL/SQL stored procedures as Java methods can present problems, however. Arguments to such functions or procedures may use the PL/SQL mode "out" or "in out," but there are no equivalent modes for passing arguments in Java. A method that takes an int argument, for example, is not able to modify this argument in such a way that its callers can receive a new value for it.

In one embodiment, JPublisher generates single-element arrays for out and in out arguments. For an array int[ ] abc, for example, the input value is provided in abc[0], and the modified output value is also returned in abc[0]. JPublisher also uses a similar pattern when generating code for SQL object type methods.

To publish database entities, JPublisher connects to the database and retrieves descriptions of SQL types, PL/SQL packages, or server-side Java classes that can be specified on the command line or in an INPUT file.

JPublisher generates a Java class for each SQL type or PL/SQL package that it translates, and each server-side Java class that it processes. Generated classes include code required to read objects from and write objects to the database. When a wrapper method on an instance of a class that was generated for a SQL object is called, the SQL value for the corresponding object is sent to the server along with any in or in out arguments. Then the underlying method (stored procedure or function) is invoked, and the new object value is returned to the client along with any out or in out arguments.

The JPublisher code that is generated is in terms of parameter types and modes are the inner parameter type and mode methods. The generated Java code typically ends up with a different type and/or mode model than the code that is desired by the user, which are the outer parameter and mode methods. Embodiments of the invention allow efficient translation between these two, when desired.

JPublisher style files allow Java-to-Java type mappings to be specified. This is to ensure, for example, that generated classes can be used in Web services. As a particular example, CLOB types such as java.sql.Clob and oracle.sql.CLOB cannot be used in Web services, but the data can be used if converted to a type, such as java.lang.String, that is supported by Web services.

Typically, templates or style files are provided by Oracle, but there may be situations in which a user would want to edit or create her own. The key portion of a style file is the TRANSFORMATION section—everything between the TRANSFORMATION tag and END_TRANSFORMATION tag. This section describes type transformations (Java-to-Java mappings) to be applied to types used for object attributes or in method signatures.

For convenience, there is also an OPTIONS section in which any other JPublisher option settings can be specified. In this way, a style file can replace the functionality of any other JPublisher properties file, in addition to specifying mappings.

This Style File TRANSFORMATION Section provides a template for a style file TRANSFORMATION section, with comments. Within the TRANSFORMATION section, there is a MAPPING section (from a MAPPING tag to an END_MAPPING tag) for each mapping that is specified. Each MAPPING section includes a number of subtags with additional information. SOURCETYPE and TARGETTYPE subtags are required. Within each TARGETTYPE section, information for at least the RETURN, IN, and OUT cases, using the corresponding tags should be specified.

Below is a high-level outline of the template format and of the various pieces of information that can be supplied in the template.

TRANSFORMATION
IMPORT
Packages to be imported by the generated classes
END_IMPORT
THE FOLLOWING OPTION ONLY APPLIES TO PL/SQL PACKAGES
This interface should be implemented/extended by
the methods in the user subclasses and interfaces
This option takes no effect when subclass is not generated.

```
SUBCLASS_INTERFACE<java interface>
# THE FOLLOWING OPTION ONLY APPLIES TO
PL/SQL PACKAGES
  # Each method in the interface and the user subclass should
  # throw this exception (the default SQLException will be
caught
  # and re-thrown as an exception specified here)
  # This option takes no effect when subclass is not gener-
ated.
  SUBCLASS_EXCEPTION Java_exception_type
STATIC
  # Any code provided here is inserted at the
  # top level of the generated subclass regardless
  # of the actual types used.
END_STATIC
# Enumerate as many MAPPING sections as needed.
MAPPING
  SOURCETYPE Java_source_type
  # Can be mapped to several target types.
  TARGETTYPE Java_target_type
    # With CONDITION specified, the source-to-target
    # mapping is carried out only when the listed Java
    # classes are present during publishing.
    # The CONDITION section is optional.
    CONDITION list_of_java_classes
    IN
    # Java code for performing the transformation
    # from source type argument %1 to the target
    # type, assigning it to %2.
    END_IN
    IN_AFTER_CALL
    # Java code for processing IN parameters
    # after procedure call.
    END_IN_AFTER_CALL
    OUT
    # Java code for performing the transformation
    # from a target type instance %2 to the source
    # type, assigning it to %1.
    END_OUT
    RETURN
    # Java code for performing the transformation
    # from source type argument %1 to the target
    # type and returning the target type.
    END_RETURN
    # Include the code given by a DEFINE . . . END_DEFINE
block
    # at the end of this template file.
    USE defined_name
    # Holder for OUT/INOUT of the type defined by
SOURCETYPE.
    HOLDER Java_holder_type
  END_TARGETTYPE
  # More TARGETTYPE sections, as needed
END_MAPPING
DEFAULT_HOLDER
  # JPublisher will generate holders for types that do
  # not have HOLDER entries defined in this template.
  # This section includes a template for class definitions
  # from which JPublisher will generate .java files for
  # holder classes.
END_DEFAULT_HOLDER
# More MAPPING sections, as needed
DEFINE defined_name
  # Any code provided here is inserted at the
  # top level of the generated class if the
  # source type is used.
END_DEFINE
# More DEFINE sections, as needed
END_TRANSFORMATION
```

The details about templates or style files are provided to illustrate an exemplary embodiment. Other embodiments may utilize different templates so the invention is not limited to the embodiments described herein.

In one embodiment that can be utilized in the JPublisher product, FIGS. 7A and 7B show an example of a template for template-driven type and mode mapping for webservices 9. Similarly, FIGS. 8A-8C show a template for web services 10. And still, FIGS. 9A-9J show a template for common properties of webservices.

By using a template mechanism, the JPublisher product can easily be adapted to generate code for different platforms:
  the Oracle Apache Soap-based 9.0.4 Web services product, represented in the webservices9.properties template.
  the Oracle JAX-RPC 10.1.3 Web services product, represented in the webservices10.properties template.

For convenience, in the concrete JPublisher embodiment, templates can include other templates using an INCLUDE directive. For example, webservices-common.properties is used by webservices9.properties and webservices10.properties. Additionally, via the OPTIONS section, the templates in the concrete JPublisher embodiment are enabled to provide directives into JPublisher, such as the style for the representation of out and in out arguments. For example, jpub.outarguments=return specifies that out, in out, and return values be represented through a compound return type in the outer method representation.

The TRANSFORMATION section consist of a sequence of MAPPING directives that map between SOURCETYPE (described as the outer parameter or return type in the rest of this document) and the TARGETTYPE (described as the inner parameter or return type in the rest of this document). In some cases it need only be noted that a particular predefined HOLDER is to be employed. In some cases patterns are employed to define whole families of conversions. A pattern may, for example, use %p to correspond to the package name, and %c to correspond to the class name.

If the identity constitutes the conversion function, then no conversion expressions need to be defined. Otherwise the code fragment between IN and END_IN defines the conversion from the outer type to the inner type, where the placeholders %1 and %2 stand in for instances of outer and, respectively, inner types that may be appropriately replaced with expressions or variables, depending on the concrete type and mode representation in effect.

Conversely, code fragments between OUT and END_OUT define conversion expressions in the opposite directions from an inner type to a corresponding outer type. Again, placeholders %1 and %2 stand in for instances of the outer type and, respectively, for the inner type.

Additional facilities used in the concrete embodiment of the template-driven type and mode conversion in the JPublisher product are as follows:
  XXX_ERROR<message> (where XXX is IN or OUT) defines an error message when a specific type conversions direction is not supported. For example, if conversions are only permitted from an inner type to a corresponding outer type but not vice versa, then one could specify a corresponding IN_ERROR message to be issued.
  SUBCLASS_INTERFACE and SUBCLASS_EXCEPTION define additional properties on types that are generated to represent outer types.

CONDITION provides additional conditions for triggering a type conversion rule, such as the presence of a particular interface The DEFINE<name><codefragment>END_DEFINE and USE<name>directives are used to define and include code fragments, where inclusion is guaranteed to occur at most once per generated class.

The DEFAULT_HOLDER segment provides a generic definition of holder classes, as well as code fragments that define how values are inserted into or extracted from the generated holder class in the various cases that we have described.

In the following we provide additional details on the template-driven type and mode conversion as embodied in JPublisher.

The Oracle style files webservices-common.properties, webservices9.properties, and webservices10.properties, through their SOURCETYPE and TARGETTYPE specifications, have a number of important Java-to-Java type mappings to support Web services and mappings of REF CURSORs.

The webservices9 and webservices10 files include webservices-common before specifying their own mappings. For SimpleXMLType, note that DocumentFragment overrides String if -style=webservices9 is set, and Source overrides String if -style=webservices10 is set.

FIG. 11 shows an example of a table of source type to target type mappings for a template or style file. In particular, FIG. 11 shows Java-to-Java Type Mappings in Oracle Style Files.

JPublisher allows multiple -style options in the command line. The OPTIONS sections are concatenated and the TRANSFORMATION sections are concatenated, except entries in MAPPING subsections are overridden as applicable. A MAPPING entry from a style file specified later in the command line overrides a MAPPING entry with the same SOURCETYPE specification from a style file specified earlier in the command line.

This functionality is useful if it is desirable to overwrite earlier defined type mappings or add new type mappings. For example, if to map SYS.XMLTYPE into java.lang.String, the setting -style=xml2string can be appended to the JPublisher command line, assuming for this example that this will access the style file ./xml2string.properties, which is defined as follows:

```
OPTIONS
jpub.defaulttypemap=SYS.XMLTYPE:oracle.sql.SimpleXMLType
END_OPTIONS
TRANSFORM
MAPPING
SOURCETYPE oracle.sql.SimpleXMLType
TARGETTYPE java.lang.String
# SimpleXMLType => String
OUT
%2 = null;
if (%1!=null) %2=%1.getstringval( );
END_OUT
# String => SimpleXMLType
IN
%1 = null;
if (%2!=null)
{
%1 = new %p.%c(__getConnection( ));
%1 = %1.createxml(%2);
}
END_IN
END_TARGETTYPE
END_MAPPING
END_TRANSFORM
```

Continuing this example, assume the following PL/SQL stored procedure definition:
 procedure foo (arg xmltype);
JPublisher maps this as follows in the base class:
 void foo (arg oracle.sql.SimpleXMLType);
And JPublisher maps it as follows in the user subclass:
 void foo (arg String);

Stored procedures called through JDBC do not have the same parameter-passing behavior as ordinary Java methods. This affects the code that is written that calls a wrapper method that JPublisher generates.

When ordinary Java methods are called, parameters that are Java objects are passed as object references. The method can modify the object. By contrast, when a stored procedure through JDBC is called, a copy of each parameter is passed to the stored procedure. If the procedure modifies any parameters, copies of the modified parameters are returned to the caller. Therefore, the "before" and "after" values of a modified parameter appear in separate objects.

Figure 12A:
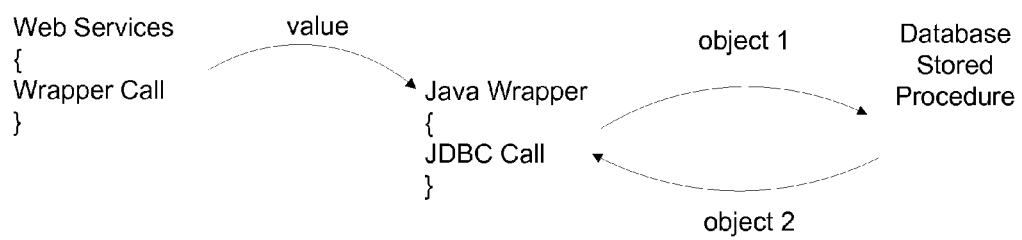
FIG. 12A shows an example of where an output value cannot be returned from a stored procedure and FIG. 12B show an example of an embodiment of the invention that utilizes an array that is passed to a wrapper method to return the value as a parameter.

FIG. 12A illustrates an example where an output value cannot be returned from a stored procedure. As shown, a web service makes a call to a Java wrapper with a value as a parameter. The Java wrapper then makes a JDBC call to a stored procedure. However, as described above, if the parameter is modified, object 1 is sent as a parameter and object 2 is returned that reflects the modification. These separate objects represent the "before" and "after" values of the parameter. Thus, the output value for the parameter is in a separate object and cannot be returned to the web service.

A wrapper method that JPublisher generates contains JDBC statements to call the corresponding stored procedure. The parameters to the stored procedure, as declared in the CREATE TYPE or CREATE PACKAGE declaration, have three possible parameter modes: IN, OUT, or IN OUT. Parameters that are IN OUT or OUT are returned to the wrapper method in newly created objects. These new values must be returned to the caller somehow, but assignment to the formal parameter within the wrapper method does not affect the actual parameter visible to the caller.

In Java, there are no OUT or IN OUT designations, but values can be returned through holders. In JPublisher, one of three alternatives for holders that handle PL/SQL OUT or IN OUT parameters can be utilized: arrays, JAX-RPC holder types and function returns.

The simplest way to solve the problem of returning output values in Java is to pass an OUT or IN OUT parameter to the wrapper method in a single-element array. Think of the array as a "container" that holds the parameter.

Figure 12B:
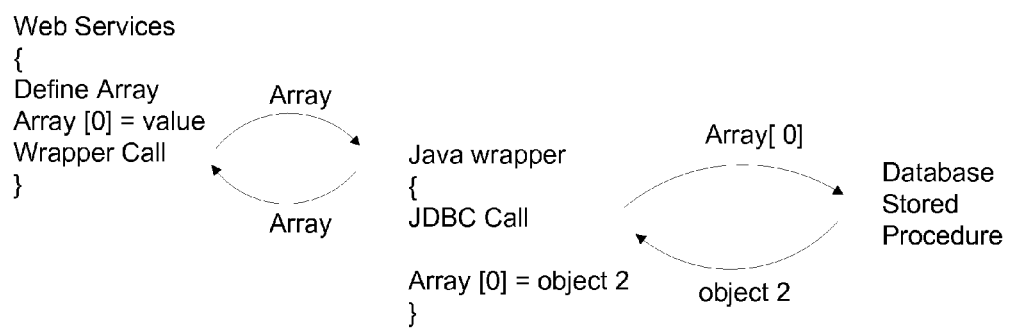

FIG. 12B shows an example of an embodiment of the invention that utilizes an array that is passed to a wrapper method to return the value as an output parameter. As shown, an array is defined. A single element array can be defined, but any number of elements can also be utilized.

The "before" value of the parameter is assigned to the first element of the array (show as Array[0]). A call is then made to the wrapper method passing the array as a parameter. The wrapper method then makes a JDBC call to the stored procedures passing the first element of the array as a parameter.

After the database stored procedure executes, the wrapper method assigns the "after" value of the parameter to the first element of the array. In this way, the "after" value is extracted from the array. The array is then returned to the web service as the output parameter.

A setting of -outarguments=array (the default) instructs JPublisher to use this single-element array mechanism to publish any OUT or IN OUT argument.

Here is another example:
Person [ ] pa={p};
x.f(pa);
p=pa[0];

Assume that x is an instance of a JPublisher-generated class that has the method f( ), which is a wrapper method for a stored procedure that uses a SQL PERSON object as an IN OUT parameter. The type PERSON maps to the Java class Person; p is a Person instance; and pa[ ] is a single-element Person array.

Although FIG. 12B shows an array data structure array that can be used for passing parameters or return values, other data structures can also be utilized. For example, holders and compound types can be utilized in other embodiments.

Figure 13:
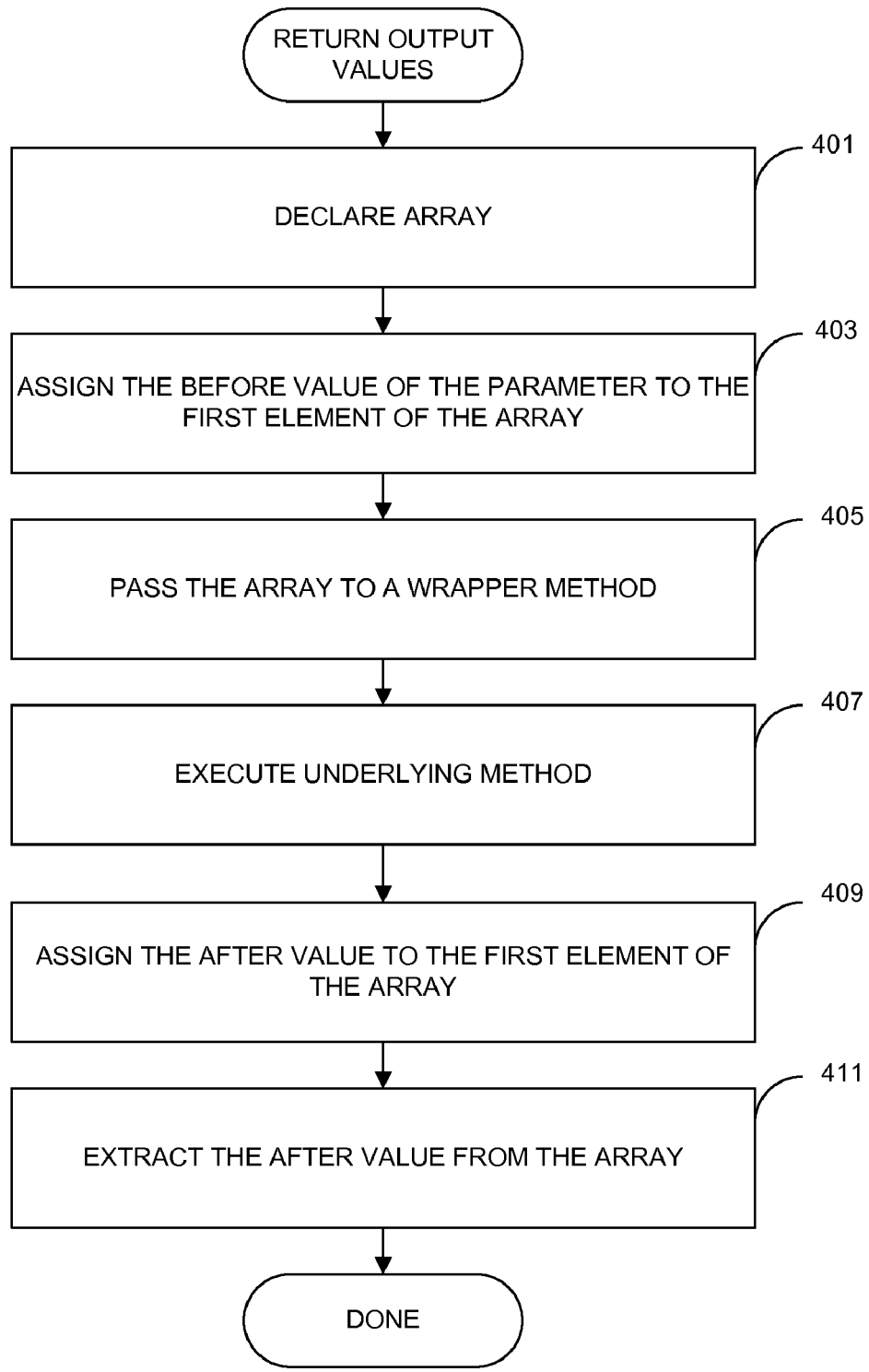
FIG. 13 shows a flowchart of a process of returning output values utilizing an array that is passed to a wrapper method.

FIG. 13 shows a flowchart of a process of returning output values utilizing an array that is passed to a wrapper method. At a step 401, an array is declared. The number of elements can vary, but in some embodiments, the array is declared as a single element array.

The "before" value of the parameter is assigned to the first element of the array. Although in some embodiments, the parameter is assigned to the first element, the parameter can be assigned to any element in the array so long as the location is known. For example, an array could store values for multiple parameters that were of the same type.

At a step 405, the array is passed to a wrapper method. The wrapper method "wraps" an underlying method and includes a call to the underlying method. The underlying method is executed at a step 407.

After the underlying method is executed, the "after" value is assigned to the first element (or a known element) of the array. This is performed in the wrapper method. Upon returning from the wrapper method, the "after" value is extracted from the array at a step 411.

The array technique for passing OUT or IN OUT parameters may require the addition of a few extra lines of code to the program for each parameter. As another example, consider the PL/SQL function created by the following SQL*Plus command:

SQL>create or replace function g (a0 number, a1 out number, a2 in out number, a3 clob, a4 out clob, a5 in out clob) return clob is begin return null; end;

With -outarguments=array, this is published as follows:
public oracle.sql.CLOB g (
java.math.BigDecimal a0,
java.math.BigDecimal a1[ ],
java.math.BigDecimal a2[ ],
oracle.sql.CLOB a3,
oracle.sql.CLOB a4[ ],
oracle.sql.CLOB a5[ ])

Problems similar to those described earlier arise when the this object of an instance method is modified.

The this object is an additional parameter, passed in a different way. Its mode, as declared in the CREATE TYPE statement, may be IN or IN OUT. If the mode of this is not explicitly declared, its mode is IN OUT if the stored procedure does not return a result, or IN if it does.

If the mode of the this object is IN OUT, then the wrapper method should return the new value of this. The code generated by JPublisher implements this functionality in different ways, depending on the situation:

For a stored procedure that does not return a result, the new value of this is returned as the result of the wrapper method. As an example, assume that the SQL object type MYTYPE has the following member procedure:

MEMBER PROCEDURE f1 (y IN OUT INTEGER);

Also assume that JPublisher generates a corresponding Java class, MyJavaType. This class defines the following method:

MyJavaType f1 (int[ ] y)

The f1 ( ) method returns the modified this object value as a MyJavaType instance.

For a stored function (a stored procedure that returns a result), the wrapper method returns the result of the stored function as its result. The new value of this is returned in a single-element array, passed as an extra argument (the last argument) to the wrapper method.

Assume that the SQL object type MYTYPE has the following member function:

MEMBER FUNCTION f2 (x IN INTEGER) RETURNS VARCHAR2;

Then the corresponding Java class, MyJavaType, defines the following method:

String f2(int x, MyJavaType[ ] newValue)

The f2 ( ) method returns the VARCHAR2 function-return as a Java string, and returns the modified this object value as an array element in the MyJavaType array.

For PL/SQL static procedures or functions, Jpublisher generates instance methods, not static methods, in the wrapper class. This is the logistic for associating a database connection with each wrapper class instance. The connection instance is used in initializing the wrapper class instance so that it is not required to subsequently explicitly provide a connection or connection context instance when calling wrapper methods.

The JAX-RPC specification explicitly specifies holder classes in the javax.xml.rpc.holders package for the Java mapping of simple XML data types and other types. Typically, "Holder" is appended to the type name for the holder class name. For example, BigDecimalHolder is the holder class for BigDecimal.

Given a setting of -outarguments=holder, JPublisher uses holder instances to publish OUT and IN OUT arguments from stored procedures. Holder settings are specified in a JPublisher style file, in the HOLDER subtag inside the TARGETTYPE section for the appropriate mapping. If no holder class is specified, then Jpublisher can choose one according to defaults.

As an example, again consider the PL/SQL function created by the following SQL*Plus command:

SQL>create or replace function g (a0 number, a1 out number, a2 in out number, a3 clob, a4 out clob, a5 in out clob) return clob is begin return null; end;

With -outarguments=holder, the following is an example of how the function is published. In this case, there is an extra level of abstraction—because oracle.sql.CLOB is not supported by Web services, it is mapped to String, the JAX-RPC holder class for which is StringHolder.

Assume the following JPublisher command to publish the function g. (The webservices10 style file contains an entry for -outarguments=holder.)

% jpub -u scott/tiger -s toplevel"(g)":TopLevelG -style=webservices10

Here is the published interface:
public java.lang.String g
(java.math.BigDecimal a0,
javax.xml.rpc.holders.BigDecimalHolder_xa1_out_x,
javax.xml.rpc.holders.BigDecimalHolder_xa2_inout_x,
java.lang.String a3,
javax.xml.rpc.holders.StringHolder_xa4_out_x,
javax.xml.rpc.holders.StringHolder_xa5_inout_x)
throws java.rmi.RemoteException;

The setting -outarguments=return can be used as a workaround for supporting method signatures in Web services that do not use JAX-RPC holder types or arrays. In a situation in which there is no support for JAX-RPC holders, the -outarguments=return setting allows OUT or IN OUT data to be returned in function results.

Once again, consider the PL/SQL function created by the following SQL*Plus command:

SQL>create or replace function g (a0 number, a1 out number, a2 in out number, a3 clob, a4 out clob, a5 in out clob) return clob is begin return null; end;

Assume the following JPublisher command (a wraparound command, with output also shown) to publish the function g. Although the webservices10 style file specifies -outarguments=holder, the -outarguments=return setting comes after the -style setting so takes precedence.

% jpub -u scott/tiger -s toplevel"(g)":Top levelG -style=webservices10
-outarguments=return
SCOTT.top_level_scope
ToplevelGUser_g_Out The JPublisher output acknowledges that it is processing the SCOTT top level, and also indicates the creation of the Java class ToplevelGUser_g_Out to support output values of the function g through return data.

JPublisher generates the following interface to take input parameters and return output parameters:

```
public ToplevelGUser_g_Out g
(java.math.BigDecimal a0,
    java.math.BigDecimal xxa2__inoutxx,
    java.lang.String a3,
    java.lang.String xxa5__inoutxx)
throws java.rmi.RemoteException;
JPublisher generates the TopLevelGUser_g_Out class as follows:
public class ToplevelGUser_g_Out
{
public ToplevelGUser_g_Out( ) { }
public java.math.BigDecimal getA1Out( ) { return a1__out; }
public void setA1Out(java.math.BigDecimal a1__out)
{ this.a1__out = a1__out; }
public java.math.BigDecimal getA2Inout( ) { return a2__inout; }
public void setA2Inout(java.math.BigDecimal a2__inout)
{ this.a2__inout = a2__inout; }
public java.lang.String getA4Out( ) { return a4__out; }
}
```

The return type ToplevelGUser_g_Out encapsulates the values of the OUT and IN OUT parameters to be passed back to the caller of the function. As in the preceding section, oracle.sql.CLOB is mapped to String by the webservices10 style file.

JPublisher style files enable Java-to-Java type mappings to be specified in some embodiments. A typical use for such mappings is to ensure that generated classes can be used in Web services. As a particular example, CLOB types such as java.sql.Clob and oracle.sql.CLOB cannot be used in Web services. However, the data can be used if converted to a type, such as java.lang.String, that is supported by Web services.

If the JPublisher -style option is used to specify a style file, JPublisher generates subclasses that implement the Java-to-Java type mappings specified in the style file. This includes the use of "holder" classes for handling output arguments—data corresponding to PL/SQL OUT or IN OUT types.

For example, consider the following PL/SQL package, foo_pack, consisting of the stored function foo:
    create or replace package foo_pack as
    function foo(a IN OUT sys.xmltype, b integer) return CLOB;
    end;
Assume that the foo_pack package is translated as follows:
% jpub -u scott/tiger -s foo_pack:FooPack -style=webservices10

This command uses the style file webservices10.properties for Java-to-Java type mappings. (This style file is supplied by Oracle and is typically appropriate for using Web services in an Oracle Database 10g environment.) The webservices10.properties file specifies the following (among other things):

The mapping of the Java type oracle.sql.SimpleXMLType (which is not supported by Web services) to the Java type javax.xml.transform.Source (which is):
    SOURCETYPE oracle.sql.SimpleXMLType
    TARGETTYPE javax.xml.transform.Source
    . . .
The use of holder classes for PL/SQL OUT and IN OUT arguments:
    jpub.outarguments=holder
This setting directs JPublisher to use instances of the appropriate holder class, in this case javax.xml.rpc.holders.SourceHolder, for the PL/SQL output argument of type XMLTYPE.

The inclusion of webservices-common.properties:
    INCLUDE webservices-common
The webservices-common.properties file (typically supplied by Oracle) specifies the following:
The mapping of SYS.XMLTYPE to oracle.sql.SimpleXMLType in the JPublisher default type map:
    jpub.adddefaulttypemap=SYS.XMLTYPE:oracle.sql.SimpleXMLType
A code generation naming pattern:
    jpub.genpattern=%2Base:%2User#%2
Based on the "-s foo_pack:FooPack" specification to JPublisher, the genpattern setting results in generation of the interface FooPack, the base class FooPackBase, and the user subclass FooPackUser, which extends FooPackBase and implements FooPack.

The mapping of the Java type oracle.sql.CLOB (which is not supported by Web services) to the Java type java.lang.String (which is):
    SOURCETYPE oracle.sql.CLOB
    TARGETTYPE java.lang.String
    . . .
Recall the calling sequence for the foo stored function:
    function foo(a IN OUT sys.xmltype, b integer) return CLOB;
The base class generated by JPublisher, FooPackBase, has the following corresponding method declaration:
    public oracle.sql.CLOB_foo (oracle.sql.SimpleXMLType a[ ], Integer b);
As described above, the base class can uses an array to support the output argument.

The user subclass has the following corresponding method declaration:
    public java.lang.String foo (SourceHolder_xa_inout_x, Integer b);
This is because of the specified mapping of oracle.sql.SimpleXMLType to javax.xml.transform.Source, the specified use of holder classes for output arguments, and the specified mapping of oracle.sql.CLOB to java.lang.String (all as described earlier).

Following is the class SourceHolder, the holder class for Source:

```
// Holder class for javax.xml.transform.Source
public class SourceHolder implements javax.xml.rpc.holders.Holder
{
    public javax.xml.transform.Source value;
    public SourceHolder( ) { }
    public SourceHolder(javax.xml.transform.Source value)
        { this.value = value; }
}
```

Generated user subclasses employ the following general functionality for Java-to-Java type transformations in the wrapper method:

```
User subclass method
{
    Enter Holder layer (extract IN data from the holder)
    Enter Java-to-Java mapping layer (from target to source)
    Call base class method (uses JDBC to invoke wrapped procedure)
    Exit Java-to-Java mapping layer (from source to target)
    Exit Holder layer (update the holder)
}
For the example, this is as follows in the foo( ) method of
the class FooPackUser:
foo (SourceHolder, Integer)
{
    SourceHolder -> Source
    Source -> SimpleXMLType
      _foo (SimpleXMLType[ ], Integer);
    SimpleXMLType -> Source
    Source -> SourceHolder
}
```

The holder layer retrieves and assigns the holder instance.

In the example, the holder layer in foo( ) performs the following:

1. It retrieves a Source object from the SourceHolder object that is passed in to the foo( ) method (data input).

2. After processing (which occurs inside the type conversion layer), it assigns the SourceHolder object from the Source object that was retrieved and processed (data output).

The type conversion layer first takes the target type (TARGETTYPE from the style file), next converts it to the source type (SOURCETYPE from the style file), then calls the corresponding method in the base class (which uses JDBC to invoke the wrapped stored function), and finally converts the source type returned by the base class method back into the target type to return to the holder layer.

In this example, the type conversion layer in foo( ) performs the following:

1. It takes the Source object from the holder layer (data input).

2. It converts the Source object to a SimpleXMLType object.

3. It passes the SimpleXMLType object to the _foo( ) method of the base class, which uses JDBC to invoke the foo stored function.

4. It takes the SimpleXMLType object returned by the _foo( ) method (output from the foo stored function).

5. It converts the SimpleXMLType object back to a Source object for the holder layer (data output).

While the above is a complete description of preferred embodiments of the invention, various alternatives, modifications, and equivalents can be used. It should be evident that the invention is equally applicable by making appropriate modifications to the embodiments described above. For example, although properties of specific embodiments have been described, embodiments of the invention are not limited to these properties. Therefore, the above description should not be taken as limiting the scope of the invention that is defined by the metes and bounds of the appended claims along with their full scope of equivalents.

What is claimed is:

1. A method of converting types of parameters between two stored procedures utilizing different types, wherein the two procedures are stored in a computer memory, comprising:
    receiving a first type for a parameter from a first stored procedure to be sent to a second stored procedure utilizing different types;
    retrieving a template that specifies a type conversion of the first type to a second type for the second stored procedure;
    converting the first type to the second type as specified in the template, wherein the template comprises mappings between the first and second types;
    if a first mode for the parameter uses holders for out or in out parameters and the first mode is out or in out, determining if there is a holder type for the first type that is predefined;
    after the determining if there is a holder type for the first type that is predefined, if there is no holder type for the first type that is predefined, declaring the holder type;
    creating a first expression that extracts an underlying value of the parameter using the mappings to a value of the second type;
    passing the first expression to a second expression, the second expression comprising a placeholder for the underlying value of the first type; and
    executing the second expression, wherein the executing the second expression comprises evaluating the underlying value of the first type to a corresponding parameter value of the second type.

2. The method of claim 1, further comprising converting a returned data type as specified in the template.

3. The method of claim 1, wherein the first procedure is a Java interface.

4. The method of claim 1, wherein the second procedure is a SQL interface for a database.

5. The method of claim 1 further comprising passing the parameter to the second stored procedure as the second type.

6. The method of claim 1 wherein the parameter is generated by the first stored procedure.

7. The method of claim 1 wherein the first stored procedure is for a first application and the second stored procedure is for a second application.

8. The method of claim 1 comprising:
    executing the second stored procedure using the parameter of the second type to obtain a processed parameter of the second type;
    converting the processed parameter of the second type to a processed parameter of the first type; and passing the processed parameter of the first type to the first stored procedure.

9. The method of claim 1, further comprising extending the template to include a first new type and a new type mapping, wherein both the first new type and the new type mapping were not previously in the template.

10. The method of claim 1, further comprising:
    publishing the second stored procedure via a wrapper method by specifying the conversion of the first type to the second type in the template.

11. The method of claim 1, wherein the template further comprises computer code to cause an error message that informs a user a specific type conversion direction is not supported.

12. The method of claim 1, wherein the template is created before the first or second stored procedures are created.

13. The method of claim 1, wherein the passing the parameter to the second stored procedure comprises passing at least two different parameters to the second stored procedure.

14. The method of claim 1, wherein the first type for a parameter is not defined by a computer programming language.

15. The method of claim 1 wherein the first mode for the parameter uses an array for out or in out parameters, the first mode is out or in out, and the underlying value of the parameter extracted by the first expression is at a location in the array.

16. A method of converting types of parameters between two stored procedures utilizing different types, comprising:
receiving a first type for a parameter from a first stored procedure to be sent to a second stored procedure utilizing different types;
retrieving a template that specifies a conversion of the first type to a second type for the second stored procedure, wherein the template further specifies a conversion of a first mode to a second mode;
converting the first type to the second type as specified in the template, wherein the template comprises mappings between the first and second types, and the second type is capable of being converted back to the first type;
passing the parameter to the second stored procedure as the second type, wherein the first parameter mode model uses holders for representing out and in out parameters and the first mode is out or in out;
determining if there is a predefined or previously defined holder type for the corresponding first type;
if there is no predefined or previously defined holder type for the corresponding first type, creating the holder type;
passing a parameter of the holder type to the first stored procedure;
creating a first expression that extracts the underlying value from the parameter of the holder type; and
passing the first expression into a second expression, wherein the second expression is a programming language expression comprising a placeholder for a parameter value of the first type, which when executed takes the parameter value in the first type and evaluates to a corresponding parameter value in the second type.

17. A method of converting types of parameters between two stored procedures utilizing different types, comprising:
receiving a first type for a parameter from a first stored procedure to be sent to a second stored procedure utilizing different types;
retrieving a template that specifies a conversion of the first type to a second type for the second stored procedure, wherein the template further specifies a conversion of a first mode to a second mode, wherein the first mode is associated with a first parameter mode model and the second mode is associated with a second parameter mode model, wherein the template further specifies a conversion of a first mode to a second mode, wherein the first mode is associated with a first parameter mode model and the second mode is associated with a second parameter mode model;
converting the first type to the second type as specified in the template, wherein the template comprises mappings between the first and second types, and the second type is capable of being converted back to the first type;
passing the parameter to the second stored procedure as the second type, wherein the first parameter mode model uses arrays for representing out and in out parameters and the first mode is out or in out;
passing a parameter of an array type to the first stored procedure;
creating a first expression that extracts an element from the parameter at a first location;
passing the first expression into a second expression, wherein the second expression is a programming language expression comprising a placeholder for a parameter value of the first type, which when executed takes the parameter value in the first type and evaluates to a corresponding parameter value in the second type; and
assigning the corresponding parameter value in the second type to the array at the first location.

18. A method of generating a conversion expression between a first procedure to a second procedure, wherein the two procedures are stored in a computer memory, comprising:
determining if a first mode model of a first procedure is different from a second mode model of a second procedure;
if the first mode model is different from the second mode model, creating the corresponding mode in the second procedure if there does not exist a previously defined corresponding mode in the second procedure;
creating a template, wherein the template specifies a mapping from a first type of the first procedure to a second type of the second procedure;
creating a first expression that extracts a value from the parameter of the corresponding mode; and
passing the first expression to a conversion expression, wherein the conversion expression is a programming language expression comprising a placeholder for a parameter value of the first type, which when executed takes the parameter value in the first type and evaluates to a corresponding parameter value in the second type.

19. The method of claim 18, wherein the mode model is an array, a holder, or a composite type.

20. A method of converting types of parameters between two stored procedures utilizing different types, comprising:
receiving a first type for a parameter from a first stored procedure to be sent to a second stored procedure utilizing different types;
retrieving a template that specifies a conversion of the first type to a second type for the second stored procedure;
determining if there is a predefined or previously defined holder type for the corresponding first type, wherein the first parameter mode model uses holders for representing out and in out parameters and the first mode is out or in out;
if there is no predefined or previously defined holder type for the corresponding first type, creating the holder type, wherein the first parameter mode model uses holders for representing out and in out parameters and the first mode is out or in out;
passing a parameter of the first parameter mode model to the first stored procedure, wherein the first mode is out or in out;
creating a first expression that extracts the underlying value from the parameter, wherein the first mode is out or in out; and
passing the first expression into a second expression, wherein the second expression is a programming language expression comprising a placeholder for a parameter value of the first type, which when executed takes the parameter value in the first type and evaluates to a corresponding parameter value in the second type.

21. A computer program product, stored in a computer readable storage medium executable by a computer, that converts between types and modes of parameters between two stored procedures, comprising:

computer code that receives a first type for a parameter from a first procedure of an application to be sent to a second procedure of the application utilizing different types;

computer code that determines if there is a predefined holder type for the corresponding first type;

computer code that if there is no predefined holder type for the corresponding first type, defines the holder type;

computer code that passes a parameter of the holder type to the first procedure;

computer code that retrieves a first template that specifies a conversion of the first type to a second type for the second procedure;

computer code that determines whether a first mode for a parameter is in out;

computer code that if the first mode for a parameter is in out, converts the first type to the second type as specified in the first template wherein the first template comprises mappings between the first and second types;

computer code that creates a first expression that extracts the underlying value from the parameter of the holder type;

computer code that passes the first expression into a second expression, wherein the second expression is a programming language expression comprising a placeholder for a parameter value of the first type, which when executed takes the parameter value in the first type and evaluates to a corresponding parameter value in the second type;

computer code that passes the parameter to the second procedure as the second type;

computer code that executes the second procedure;

computer code that if the first mode for a parameter is in out, retrieves a second template that specifies a conversion of the second type to the first type; and computer code that after executing the second procedure, converts a result of the second procedure from the second type to the first type.

* * * * *

UNITED STATES PATENT AND TRADEMARK OFFICE
CERTIFICATE OF CORRECTION

| | | |
|---|---|---|
| PATENT NO. | : 7,860,894 B2 | Page 1 of 1 |
| APPLICATION NO. | : 11/126422 | |
| DATED | : December 28, 2010 | |
| INVENTOR(S) | : Ekkehard Rohwedder et al. | |

It is certified that error appears in the above-identified patent and that said Letters Patent is hereby corrected as shown below:

In column 4, line 6-7, delete "interacts" and insert -- interact --, therefor.

In column 4, line 52, delete "15" and insert -- 115 --, therefor.

Signed and Sealed this
Thirteenth Day of September, 2011

David J. Kappos
*Director of the United States Patent and Trademark Office*